United States Patent
Nakata et al.

(10) Patent No.: US 8,917,421 B2
(45) Date of Patent: Dec. 23, 2014

(54) PRINTING APPARATUS AND METHOD OF CONTROLLING PRINTING APPARATUS

(71) Applicants: Mitsutaka Nakata, Tokyo (JP); Shunsuke Arita, Tokyo (JP); Satoko Fujiwara, Kanagawa (JP); Ato Araki, Tokyo (JP)

(72) Inventors: Mitsutaka Nakata, Tokyo (JP); Shunsuke Arita, Tokyo (JP); Satoko Fujiwara, Kanagawa (JP); Ato Araki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/746,464

(22) Filed: Jan. 22, 2013

(65) Prior Publication Data

US 2013/0188206 A1    Jul. 25, 2013

(30) Foreign Application Priority Data

Jan. 25, 2012    (JP) .................................. 2012-013560

(51) Int. Cl.
*G06F 15/00* (2006.01)
*G06K 1/00* (2006.01)
*G06F 3/12* (2006.01)

(52) U.S. Cl.
CPC ............ *G06F 3/1295* (2013.01); *G06F 3/1211* (2013.01); *G06F 3/1247* (2013.01); *G06F 3/1282* (2013.01)
USPC .......................................... 358/1.9

(58) Field of Classification Search
None
See application file for complete search history.

(56) References Cited

U.S. PATENT DOCUMENTS

| | | | |
|---|---|---|---|
| 2005/0042009 A1* | 2/2005 | Roztocil et al. | ................. 400/62 |
| 2008/0180470 A1 | 7/2008 | Oku | |
| 2011/0228301 A1 | 9/2011 | Fujiwara | |
| 2012/0019860 A1 | 1/2012 | Fujiwara | |
| 2012/0069402 A1 | 3/2012 | Konno | |

FOREIGN PATENT DOCUMENTS

| | | |
|---|---|---|
| JP | 2002-254763 | 9/2002 |
| JP | 2008-183884 | 8/2008 |

\* cited by examiner

*Primary Examiner* — Mark Zimmerman
*Assistant Examiner* — Michael Burleson
(74) *Attorney, Agent, or Firm* — Harness, Dickey & Pierce, P.L.C.

(57) ABSTRACT

A printing apparatus includes one or more print execution units each including a plurality of storage units configured to receive and storage pieces of image data transferred from a higher level apparatus via a first transfer path, respectively, a plurality of image forming units configured to form an image on a print medium in accordance with the pieces of image data stored in the storage units, and a selection unit configured to select a path for transferring a piece of image data stored in the storage units for each of the image forming units; and a print control unit configured to control the print execution units to print the image data in accordance with control information transferred from the higher level apparatus via a second transfer path. The selection unit selects the path in accordance with configuration information indicating configuration of all of the one or more print execution units.

6 Claims, 30 Drawing Sheets

FIG.7

| No | CLASSIFI-CATION | NAME | DIRECTION (DFE⇔PCTL) | CONTENTS |
|---|---|---|---|---|
| 1 | JOB INFOR-MATION | JOB START | ⇔ | NOTIFY/RESPOND JOB START COMMUNICATE JOB IDENTIFIER (JOBID) |
| 2 | | JOB FINISH | ⇔ | NOTIFY/RESPOND FINISH OF ALL PRINT PROCESSES REQUESTED IN JOB COMMUNICATE JOB IDENTIFIER (JOBID) |
| 3 | PRINTER STATE/ PRINT PROCESS | PRINT PROCESS RECEPTION START | ↓ | NOTIFY THAT PRINTER IS READY TO RECEIVE PRINT PROCESS |
| 4 | | PRINTER INFORMATION REQUEST/NOTIFICATION | ⇔ | REQUEST/NOTIFY NECESSARY PRINTER INFORMATION |
| 5 | | PRINT PROCESS START | ⇔ | NOTIFY/RESPOND PREPARATION OF IMAGE DATA OUTPUT ORDER, IN UNITS OF PAGES (PROCESSES) |
| 6 | | PRINT PROCESS REQUEST | ⇔ | REQUEST/RESPOND PRINT PROCESS, USING PRINT CONTROLLER COLOR, PROCESS IDENTIFICATION NUMBER, PLANE IDENTIFICATION NUMBER REQUEST IN UNITS OF PLANES, IN ORDER OF REQUEST OF ENGINE *IT IS ENGINE THAT RETRIEVES BIT MAP |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINT PROCESS COMPLETION | ↑ | PRINT REQUESTS OF ALL PAGES (PROCESSES) IS COMPLETED |
| 10 | | PROCESS STATE REPORT | ↓ | NOTIFY PRINT STATE OF PROCESS - SHEET FEEDING - SHEET DISCHARGE - PRINT START |
| 11 | | SC NOTIFICATION ERROR OCCURRENCE/ CANCELLATION | ⇅ | OBTAIN/NOTIFY FAILURE INFORMATION OF PRINTER NOTIFY FAILURE OCCURRENCE/CANCELLATION OF HIGHER LEVEL APPARATUS |
| 12 | PRINT CONDI-TION | SET PRINT CONDITION | ⇔ | NOTIFY/RESPOND PRINT CONDITION - PRINT MODE (BOTH SIDES/ONE SIDE) - PRINT TYPE (WITH DATA/WHITE SHEET) - SHEET FEEDING/DISCHARGE INFORMATION (SOURCE OF SHEET FEEDING, DESTINATION OF SHEET DISCHARGE) - PRINT SURFACE ORDER (FRONT TO BACK/BACK TO FRONT) - PRINT SHEET SIZE - PRINT DATA SIZE - RESOLUTION, GRADATION - COLOR INFORMATION, ETC. |
| 13 | CONNEC-TION | REGISTRATION/ CANCELLATION | ⇔ | REGISTER/CANCEL INFORMATION BY PRINT CONTROLLER AND HIGHER LEVEL APPARATUS |

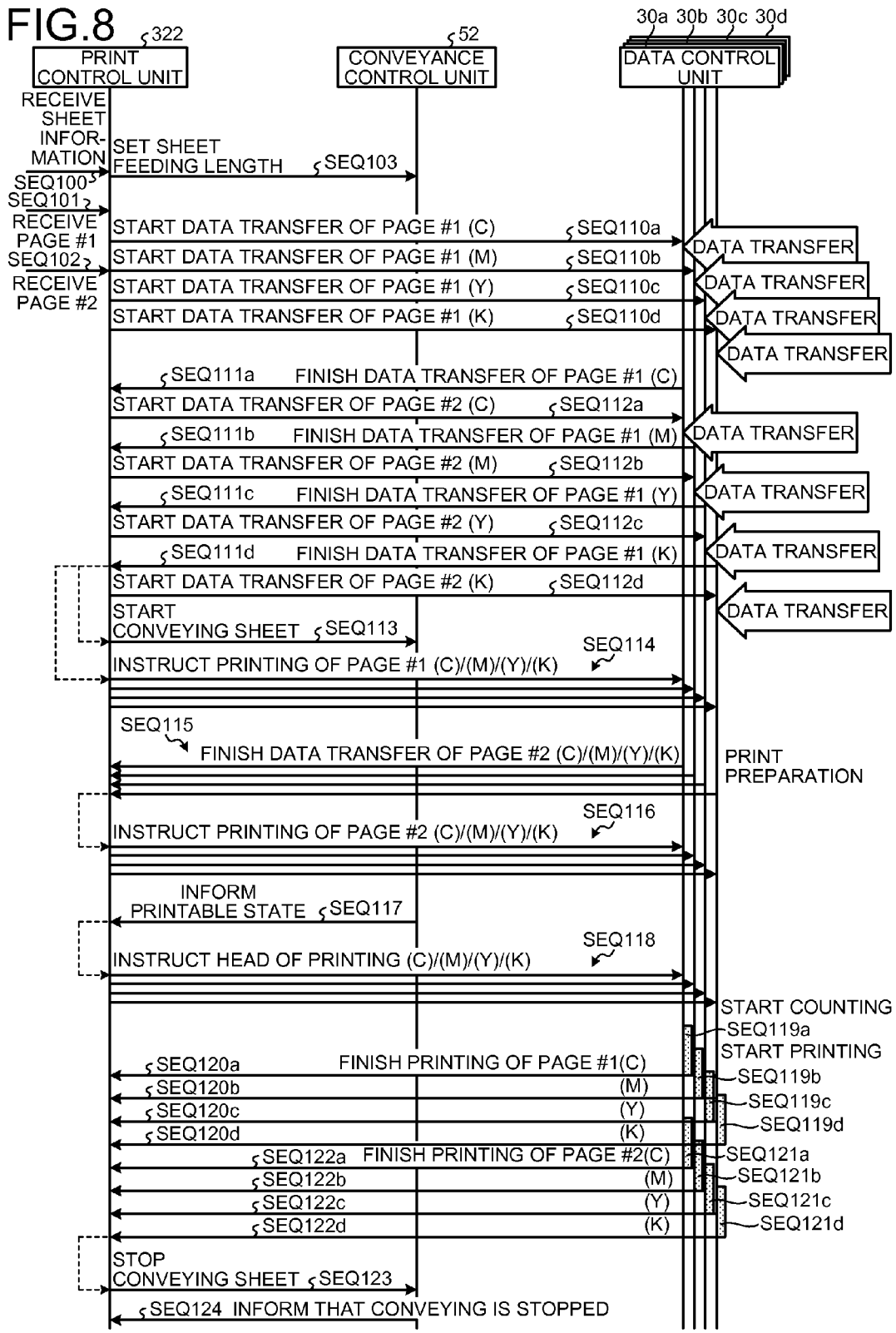

FIG.11

| ITEM NUMBER | DATA CONTROL UNIT | ITEM | CONTENTS |
|---|---|---|---|
| 1 | SAME | NUMBER OF STATIONS | 1 |
| 2 | | POSITION NUMBER OF STATION | 1 |
| 3 | | NUMBER OF DATA CONTROL UNITS PER STATION | 4 |
| 4 | 1 | COLOR OF DATA CONTROL UNIT | C |
| 5 | 2 | COLOR OF DATA CONTROL UNIT | M |
| 6 | 3 | COLOR OF DATA CONTROL UNIT | Y |
| 7 | 4 | COLOR OF DATA CONTROL UNIT | K |

FIG.12

| ITEM NUMBER | ITEM | SETTING VALUE |
|---|---|---|
| 1 | NUMBER OF USE OF INPUT I/F CONTROLLERS | 4 |
| 2 | POSITION OF STATION | 1 |
| 3 | COLOR INFORMATION (PRINT UNIT #1) | C |
| 4 | COLOR INFORMATION (PRINT UNIT #2) | M |
| 5 | COLOR INFORMATION (PRINT UNIT #3) | Y |
| 6 | COLOR INFORMATION (PRINT UNIT #4) | K |

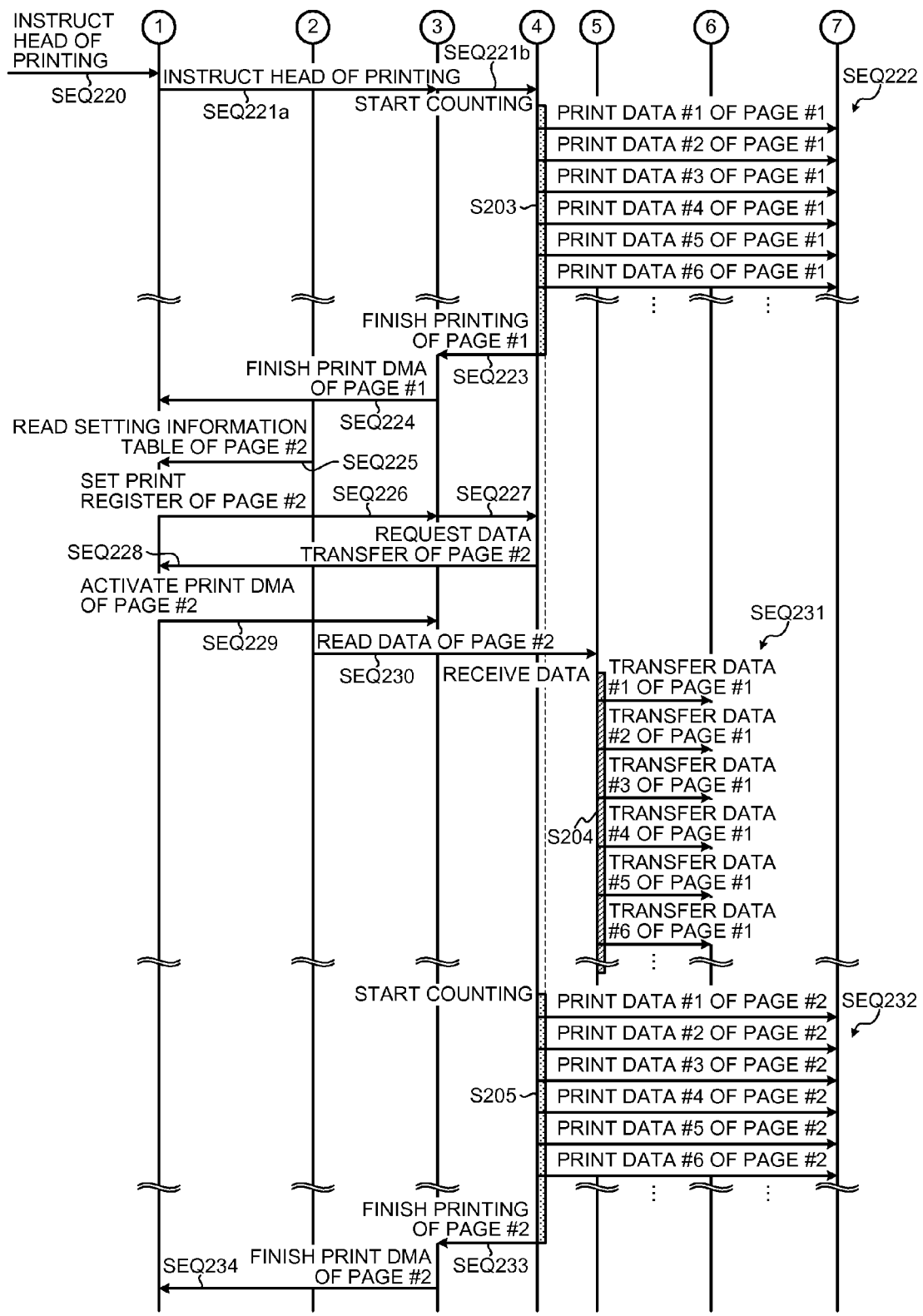

FIG.18

| ITEM NUMBER | DATA CONTROL UNIT | ITEM | CONTENTS |
|---|---|---|---|
| 1 | SAME | NUMBER OF STATIONS | 2 |
| 2 | | POSITION NUMBER OF STATION | 1/2 |
| 3 | | NUMBER OF DATA CONTROL UNITS PER STATION | 2 |
| 4 | 1 | COLOR OF DATA CONTROL UNIT | C |
| 5 | 2 | COLOR OF DATA CONTROL UNIT | M |
| 6 | 3 | COLOR OF DATA CONTROL UNIT | Y |
| 7 | 4 | COLOR OF DATA CONTROL UNIT | K |

| ITEM NUMBER | ITEM | SETTING VALUE |
|---|---|---|
| 1 | NUMBER OF USE OF INPUT I/F CONTROLLERS | 2 |
| 2 | POSITION OF STATION | 1 |
| 3 | COLOR INFORMATION (PRINT UNIT #1) | C |
| 4 | COLOR INFORMATION (PRINT UNIT #2) | C |
| 5 | COLOR INFORMATION (PRINT UNIT #3) | M |
| 6 | COLOR INFORMATION (PRINT UNIT #4) | M |

(b)

| ITEM NUMBER | ITEM | SETTING VALUE |
|---|---|---|
| 1 | NUMBER OF USE OF INPUT I/F CONTROLLERS | 2 |
| 2 | POSITION OF STATION | 2 |
| 3 | COLOR INFORMATION (PRINT UNIT #1) | Y |
| 4 | COLOR INFORMATION (PRINT UNIT #2) | Y |
| 5 | COLOR INFORMATION (PRINT UNIT #3) | K |
| 6 | COLOR INFORMATION (PRINT UNIT #4) | K |

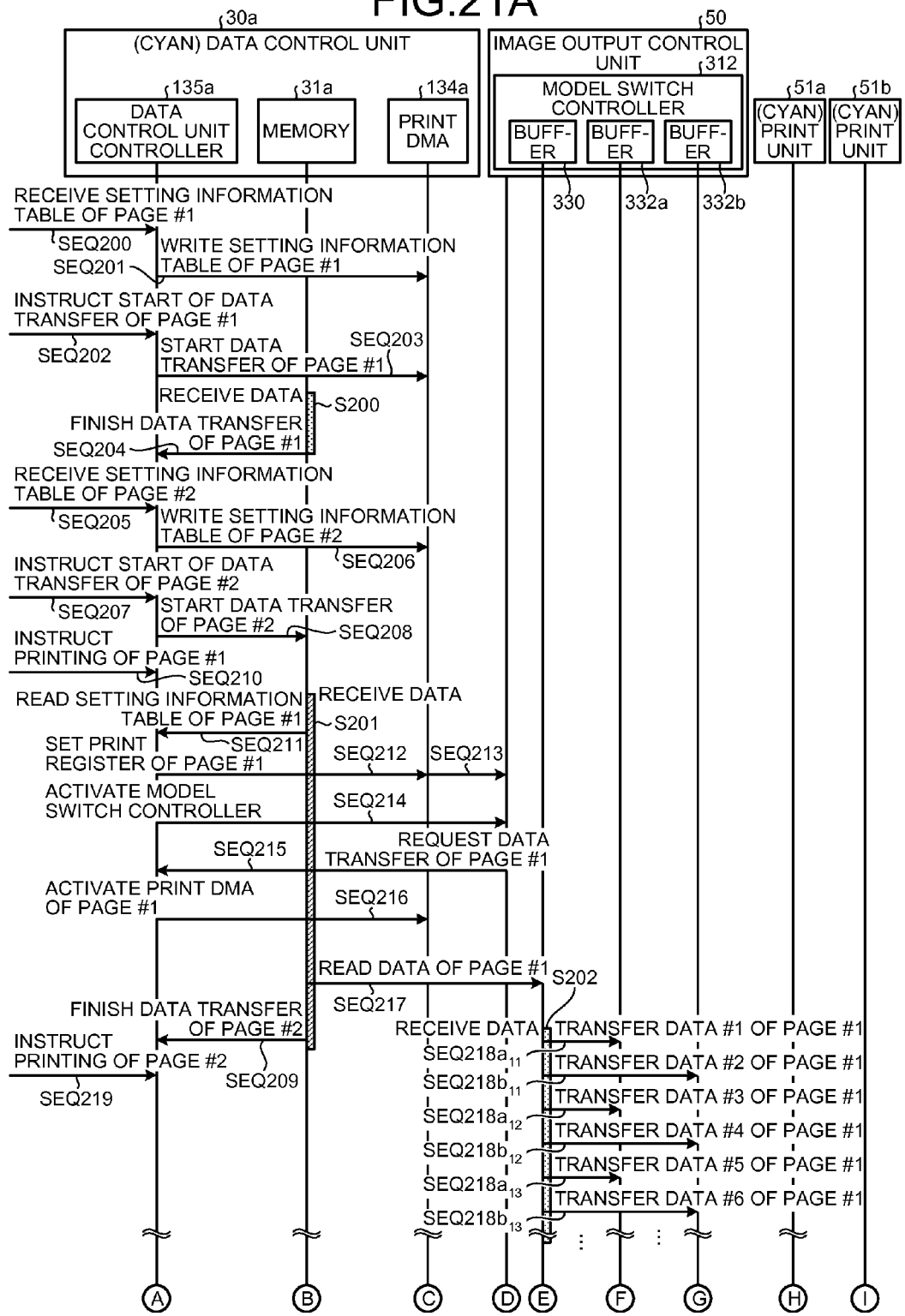

FIG.24

| ITEM NUMBER | DATA CONTROL UNIT | ITEM | CONTENTS |
|---|---|---|---|
| 1 | SAME | NUMBER OF STATIONS | 4 |
| 2 | | POSITION NUMBER OF STATION | 1/2/3/4 |
| 3 | | NUMBER OF DATA CONTROL UNITS PER STATION | 1 |
| 4 | 1 | COLOR OF DATA CONTROL UNIT | C |
| 5 | 2 | COLOR OF DATA CONTROL UNIT | M |
| 6 | 3 | COLOR OF DATA CONTROL UNIT | Y |
| 7 | 4 | COLOR OF DATA CONTROL UNIT | K |

| ITEM NUMBER | ITEM | SETTING VALUE |
|---|---|---|
| 1 | NUMBER OF USE OF INPUT I/F CONTROLLERS | 1 |
| 2 | POSITION OF STATION | 1 |
| 3 | COLOR INFORMATION (PRINT UNIT #1) | C |
| 4 | COLOR INFORMATION (PRINT UNIT #2) | C |
| 5 | COLOR INFORMATION (PRINT UNIT #3) | C |
| 6 | COLOR INFORMATION (PRINT UNIT #4) | C |

(b)

| ITEM NUMBER | ITEM | SETTING VALUE |
|---|---|---|
| 1 | NUMBER OF USE OF INPUT I/F CONTROLLERS | 1 |
| 2 | POSITION OF STATION | 2 |
| 3 | COLOR INFORMATION (PRINT UNIT #1) | M |
| 4 | COLOR INFORMATION (PRINT UNIT #2) | M |
| 5 | COLOR INFORMATION (PRINT UNIT #3) | M |
| 6 | COLOR INFORMATION (PRINT UNIT #4) | M |

(c)

| ITEM NUMBER | ITEM | SETTING VALUE |
|---|---|---|
| 1 | NUMBER OF USE OF INPUT I/F CONTROLLERS | 1 |
| 2 | POSITION OF STATION | 3 |
| 3 | COLOR INFORMATION (PRINT UNIT #1) | Y |
| 4 | COLOR INFORMATION (PRINT UNIT #2) | Y |
| 5 | COLOR INFORMATION (PRINT UNIT #3) | Y |
| 6 | COLOR INFORMATION (PRINT UNIT #4) | Y |

(d)

| ITEM NUMBER | ITEM | SETTING VALUE |
|---|---|---|
| 1 | NUMBER OF USE OF INPUT I/F CONTROLLERS | 1 |
| 2 | POSITION OF STATION | 4 |
| 3 | COLOR INFORMATION (PRINT UNIT #1) | K |
| 4 | COLOR INFORMATION (PRINT UNIT #2) | K |
| 5 | COLOR INFORMATION (PRINT UNIT #3) | K |
| 6 | COLOR INFORMATION (PRINT UNIT #4) | K |

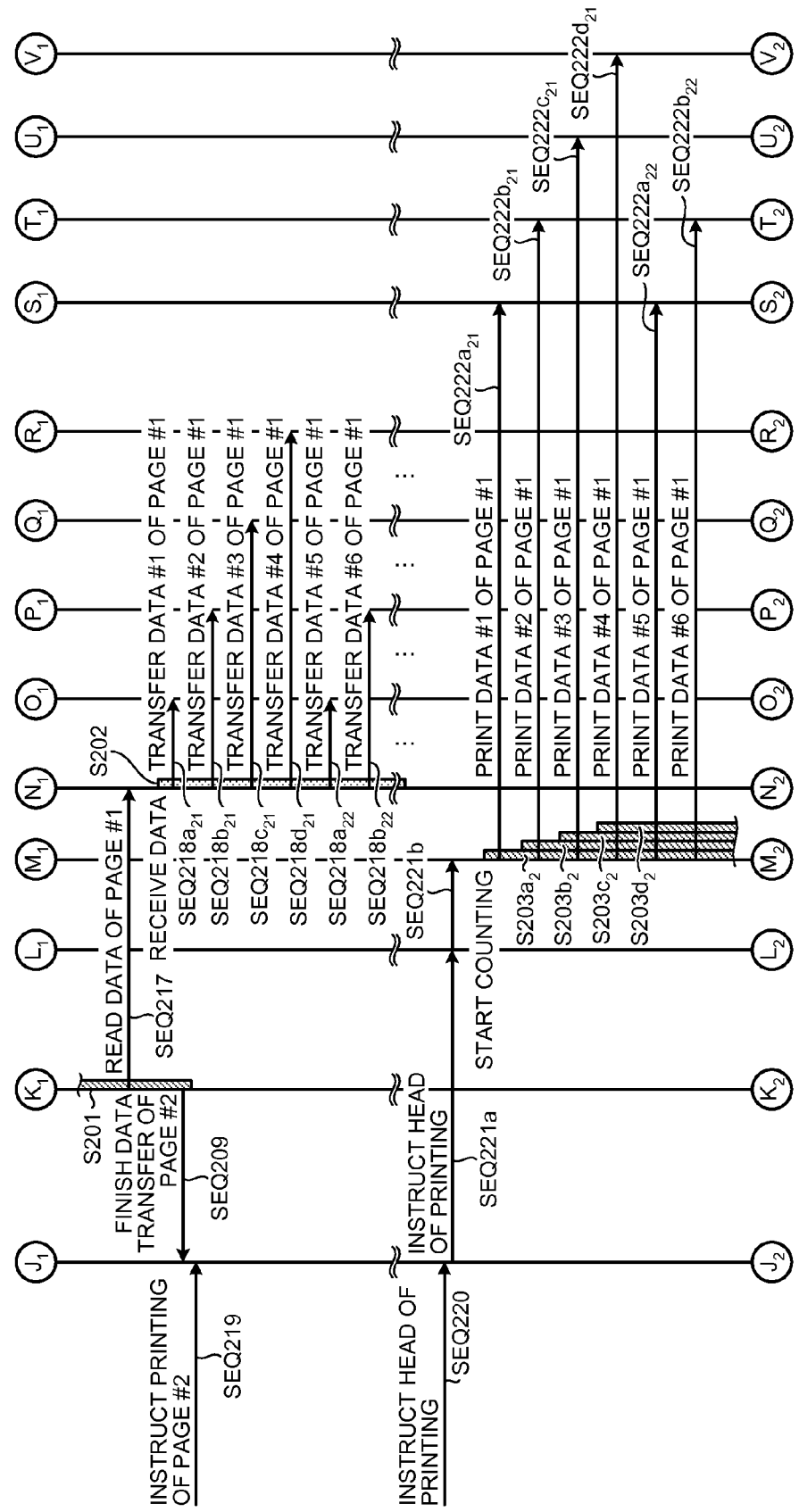

PRINTING APPARATUS AND METHOD OF CONTROLLING PRINTING APPARATUS

CROSS-REFERENCE TO RELATED APPLICATION

The present application claims priority to and incorporates by reference the entire contents of Japanese Patent Application No. 2012-013560 filed in Japan on Jan. 25, 2012.

BACKGROUND OF THE INVENTION

1. Field of the Invention

The present invention relates to a printing apparatus and a method of controlling the printing apparatus.

2. Description of the Related Art

A print system is conventionally known in which a print request from a host apparatus is once received by a higher level apparatus provided separately from a printing apparatus, and in accordance with the received print request, print image data generated by the higher level apparatus are transmitted via a data transfer path to the printing apparatus, and the printing apparatus prints the print image data.

On the other hand, a print control apparatus for controlling print operation in the printing apparatus needs to execute print operation with timing appropriate for the print process. Accordingly, a technique is already known, in which a print system for printing print image data transferred from the above higher level apparatus buffers print image data transferred from a higher level apparatus to memory of a printer engine, and a data control unit successively reads the print image data used for printing from the memory and transfers the print image data to a print unit.

Japanese Patent Application Laid-open No. 2008-183884 discloses a print system having a data control unit for sorting image data in units of ink ejection for the purpose of increasing data transfer speed. More specifically, in Japanese Patent Application Laid-open No. 2008-183884, the data control unit sorts image data transferred from the host apparatus to the printer controller for each unit of ink ejection, in accordance with nozzle arrangement of a matrix-type head of an ink jet method. Accordingly, during printing, the memory control and the data transfer can be processed at a high speed.

However, in the conventional technique using a data transfer method for transferring the print image data read by the data control unit from the memory directly to the print unit, it is difficult to change a combination of the data control units and the print units handling the same color in one print system. Therefore, when this data transfer method is used to achieve a print system capable of changing a combination of the data control units and the print units handling the same color with a model of the printer engine, there is a problem in that it is necessary to design each data control unit in accordance with the combination of the data control units and the print units.

In Japanese Patent Application Laid-open No. 2008-183884, the print image data are transferred to the print unit on the basis of the order suitable for printing. However, the configuration of Japanese Patent Application Laid-open No. 2008-183884 is such that one line of data stored in the line memory are sorted to be suitable for the two-dimensional matrix-type head, and when the combination of the data control units and the print units handling the same color, there is a problem in that it is necessary to design the data control unit in accordance with the combination of the data control units and the print units, which problem has not yet been solved by Japanese Patent Application Laid-open No. 2008-183884.

Therefore, there is a need to easily support many variations in a print system for transferring print image data to a printing apparatus from a higher level apparatus

SUMMARY OF THE INVENTION

It is an object of the present invention to at least partially solve the problems in the conventional technology.

According to an embodiment, there is provided a printing apparatus that includes one or more print execution units each including a plurality of storage units configured to receive and storage pieces of image data transferred from a higher level apparatus via a first transfer path, respectively, a plurality of image forming units configured to form an image on a print medium in accordance with the pieces of image data stored in the storage units, and a selection unit configured to select a path for transferring a piece of image data stored in the storage units for each of the image forming units; and a print control unit configured to control the print execution units to print the image data in accordance with control information transferred from the higher level apparatus via a second transfer path. The selection unit selects the path in accordance with configuration information indicating configuration of all of the one or more print execution units.

According to another embodiment, there is provided a method of controlling a printing apparatus that includes storing pieces of image data transferred from a higher level apparatus via a first transfer path, in a plurality of storage units; forming, by a plurality of image forming units, an image on a print medium in accordance with the pieces of image data stored in the storage units; and selecting, by a selection unit, a path for transferring a piece of image data stored in the storage units for each of the image forming units. The selecting includes selecting the path in accordance with configuration information indicating configuration of all of one or more print execution units each including the storage units, the image forming units, and the selection unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 illustrates an example of control information transmitted and received via a control line between the higher level apparatus and the printer controller;

FIG. 8 is a sequence diagram of an example schematically illustrating print processing according to the present embodiment;

FIG. 11 illustrates an example of a data control setting information table in a minimum configuration model;

FIG. 12 illustrates an example of an image output setting information table in a minimum configuration model;

FIGS. 16A and 16B are sequence diagrams illustrating a print sequence of an example according to a minimum configuration;

FIG. 18 illustrates an example of a data control setting information table in the middle configuration model;

FIG. 19 illustrates examples of an image output control setting information table in the middle configuration model;

FIG. 21A is a sequence diagram illustrating a print sequence of an example according to the middle configuration;

FIG. 24 illustrates an example of a data control setting information table in the maximum configuration model;

FIG. 25 illustrates examples of an image output control setting information table according to the maximum configuration model;

FIG. 27B is a sequence diagram illustrating a print sequence of an example of the maximum configuration.

DETAILED DESCRIPTION OF THE PREFERRED EMBODIMENTS

Embodiments of a printing apparatus and a control method of a printing apparatus will be hereinafter explained in details with reference to appended drawings. First, for easy understanding, a production printing to which a print system according to an embodiment is applied will be briefly explained. In the production printing, a large amount of printing is performed in a short time, as a basic idea. For this reason, in the production printing, a system of a work flow for managing generation of print data to distribution of print materials is established in order to efficiently perform job management and management of print data and increase the speed of printing.

The print system according to the embodiment relates to a portion for executing printing in the work flow of the production printing, and therefore, different apparatuses perform (raster image processor (RIP) processing and printing of bit map data obtained from the RIP processing. The RIP processing requires the longest processing time among the print processing. The speed of the printing can be increased by separating the apparatus for performing the RIP processing and the apparatus for performing the print processing.

Overview of Print System that can be Applied to Embodiment

Figure 1:
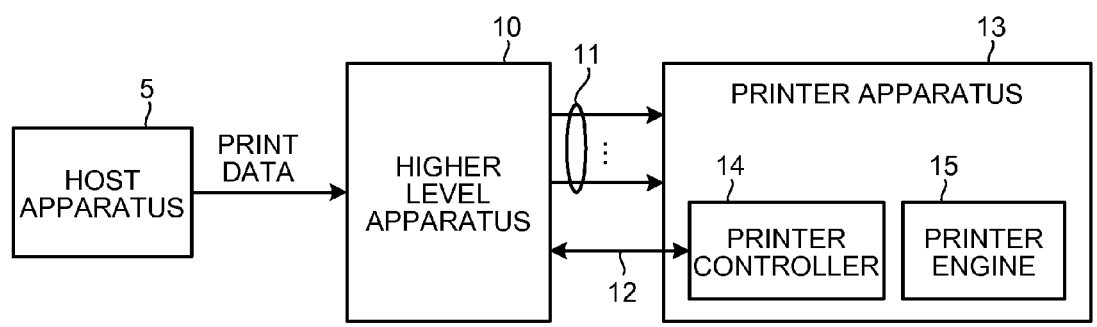
FIG. 1 is a block diagram illustrating a configuration of an example of a print system that can be applied to an embodiment of the present invention.

FIG. 1 illustrates a configuration of an example of a print system that can be applied to the embodiment of the present invention. This print system is constituted by connecting a higher level apparatus 10 and a printer apparatus 13 serving as an image forming apparatus via multiple data lines 11 and a control line 12. A host apparatus 5 is, for example, a computer, and generates print job data including print image data and print setting information.

The print job data include, for example, data of page description language (PDL) (hereinafter referred to as PDL data). By analyzing the PDL data, print setting information related to setting of printing is generated. The print setting information related to setting of printing includes, e.g., print image data including bit map images for printing, page information for printing, layout information, and information representing the number of print units.

The higher level apparatus 10 performs RIP processing in accordance with print job data supplied from the host apparatus 5, and generates bit map data for each color which are print image data. In addition, the higher level apparatus 10 generates control information for controlling print operation, on the basis of, e.g., the print job data and information given from the host apparatus 5.

The print image data for each color generated by the higher level apparatus 10 are supplied to a printer engine 15 in the printer apparatus 13 via multiple data lines 11. Control information for controlling printing is transmitted and received via the control line 12 between the higher level apparatus 10 and a printer controller 14. The printer controller 14 executes printing in accordance with the print job by controlling a printer engine 15 on the basis of transmission/reception of the control information, thus generating an image on a print medium.

The print method is not particularly limited, but in the embodiment, a print sheet is used as a print medium, and a print image is generated on a print sheet by an ink jet method. The embodiment is not limited thereto. The embodiment can also be applied to a printing apparatus that generates print image on a print sheet using toner.

As a print sheet, fan-fold paper (continuous paper) having perforations formed with a predetermined interval which can be cut, or a cut sheet which is cut into a predetermined size (A4, B4, and the like) in advance can be used. In the fan-fold paper, a page is, for example, a region sandwiched by perforations formed with a predetermined interval. In the cut sheet, one side of one print sheet is one page.

The print medium on which the print system according to the embodiment is to perform printing is not limited to a print sheet made of paper. More specifically, any other print medium may be used as long as it is a print medium on which printing can be formed according to a print method applied to the embodiment and which can be provided as a roll. For example, a plastic film, a cloth, and the like may be used as a print medium.

Higher Level Apparatus

Figure 2A:
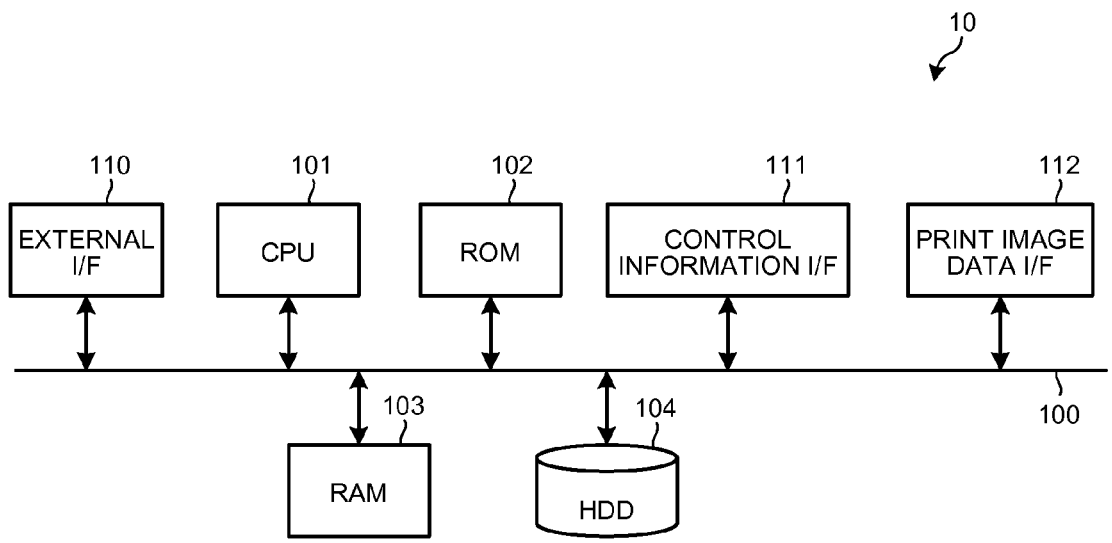
FIG. 2A is a block diagram illustrating a configuration of an example of a higher level apparatus.

FIG. 2A illustrates a configuration of an example of the higher level apparatus 10. A bus 100 is connected to a central processing unit (CPU) 101, a read only memory (ROM) 102, a random access memory (RAM) 103, and a hard disk drive (HDD) 104. The bus 100 is further connected to an external I/F 110, a control information I/F 111, and a print image data I/F 112. The units connected to the bus 100 can communicate with each other via the bus 100.

The ROM 102 and the HDD 104 stores, in advance, programs for allowing the CPU 101 to operate. The RAM 103 is used as a work memory of the CPU 101. More specifically, the CPU 101 uses the RAM 103 as a work memory to control the entire operation of the higher level apparatus 10 in accordance with the program stored in the ROM 102 and the HDD 104.

The external I/F 110 supports, for example, TCP/IP (Transmission Control Protocol/Internet Protocol), and controls communication with the host apparatus 5. The control information I/F 111 controls communication of control information. The print image data I/F 112 controls communication of print image data, and has multiple channels. For example, print image data of each color with color Y (Yellow), C (Cyan), M (Magenta), and K (Black) generated by the higher level apparatus 10 are respectively output from these multiple channels. The print image data I/F 112 is required to achieve a high transfer speed, and therefore, for example, a PCI Express (Peripheral Component Interconnect Bus Express) is used. The method of the control information I/F 111 is not particularly limited, but in this case, like the print image data I/F 112, a PCI Express is used.

In such configuration, print job data transmitted from the host apparatus 5 are received by the external I/F 110 of the higher level apparatus 10, and are stored via the CPU 101 to the HDD 104. The CPU 101 performs RIP processing on the basis of the print job data read from the HDD 104, and generates and writes bit map data of each color to the RAM 103. For example, the CPU 101 renders the page description language (PDL) data by the RIP processing, and generates and writes the bit map data of each color to the RAM 103. The CPU 101 compresses and encodes the bit map data of each color written to the RAM 103, and temporarily stores the bit map data to the HDD 104.

For example, when the printer apparatus 13 starts print operation, the CPU 101 reads the compressed and encoded bit map data of each color from the HDD 104 and decodes the compressed codes, and writes the bit map data of each color thus extracted to the RAM 103. Then, the CPU 101 reads the bit map data of each color from the RAM 103, and outputs, as print image data of each color, the bit map data from the channels of the print image data I/F 112, and provides the print image data to the printer apparatus 13. The CPU 101 transmits and receives control information for controlling printing via the control information I/F 111 with the printer apparatus 13, in accordance with progression of the print operation.

Figure 2B:
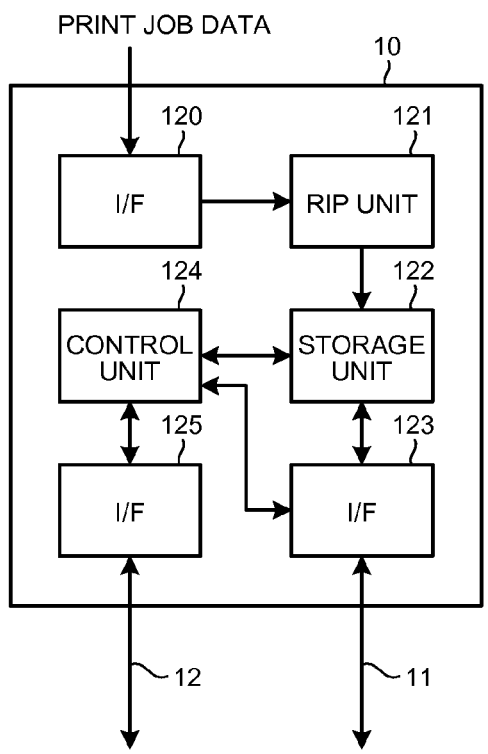
FIG. 2B is a functional block diagram illustrating an example for explaining functions of a higher level apparatus.

FIG. 2B is a functional block diagram illustrating an example for explaining functions of the higher level apparatus 10. The higher level apparatus 10 includes interfaces (I/F) 120, 123 and 125, a RIP unit 121, a storage unit 122, and a control unit 124. The interfaces 120, 123 and 125 correspond to the external I/F 110, the print image data I/F 112, and the control information I/F 111, respectively, of FIG. 2A. The RIP unit 121 and the control unit 124 are constituted by programs run by the CPU 101 in FIG. 2A. The storage unit 122 corresponds to at least one of the RAM 103 and the HDD 104 in FIG. 2A.

The host apparatus 5 generates print job data including PDL data, and transmits the print job data to the higher level apparatus 10. The print job data are received by an interface 120 and provided to the RIP unit 121. The RIP unit 121 performs rendering on the basis of the PDL data included in the provided print job data, and generates print image data of bit map data of colors, i.e., C, M, Y, K. The RIP unit 121 successively stores the print image data of the colors, C, M, Y, K, thus generated to the storage unit 122.

The control unit 124 communicates via the interface 125 with the printer controller 14 of the printer apparatus 13. For example, the control unit 124 generates control information for controlling printing in the printer apparatus 13, on the basis of the print job data provided from the host apparatus 5 via the interface 120. This control information is transmitted to the printer controller 14 from the control unit 124 via the interface 125.

The control information for controlling printing includes, for example, information about print image data and information about a print medium on which print image data are printed (print sheet). The information about the print image data includes the resolution of the print image, gradation information, information about the size of printing, the number of pages, and the like. The information about the print sheet includes information about sheet conveyance and information indicating which of the fan-fold paper or the cut sheet the print sheet is. The information about sheet conveyance includes, for example, information indicating sheet feeding length (the number of dots), a sheet feeding tray, and a sheet discharge tray, and information indicating the sheet size.

The interface 123 can independently access each piece of print image data of colors, i.e., C, M, Y, K stored in the storage unit 122. The interface 123 is connected to the printer apparatus 13 via multiple data lines 11 corresponding to colors, i.e., C, M, Y, K, and control information about print image data transfer of colors, i.e., C, M, Y, K is exchanged with the printer apparatus 13 via the multiple data lines 11, and print image data of colors, i.e., C, M, Y, K is transferred via the multiple data lines 11.

Embodiments

Subsequently, an embodiment will be explained. In this case, a configuration unit in which printing is executed by the printer engine 15 possessed by the printer apparatus 13 is called a "station" (print execution unit), and the printer engine 15 includes a conveyance control unit for conveying this station and a print medium. In the present embodiment, the printer engine 15 can have one or more stations of the same configuration, and one or more stations are controlled by the common printer controller 14. Hereinafter, in accordance with a combination of stations provided in the printer engine 15 (configuration information indicating configuration of all of one or more stations), a case where the printer engine 15 has one station will be called a minimum configuration model, and a case where the printer engine 15 has two stations will be called a middle configuration model, and case where the printer engine 15 has four stations will be called a maximum configuration model.

Figure 3:
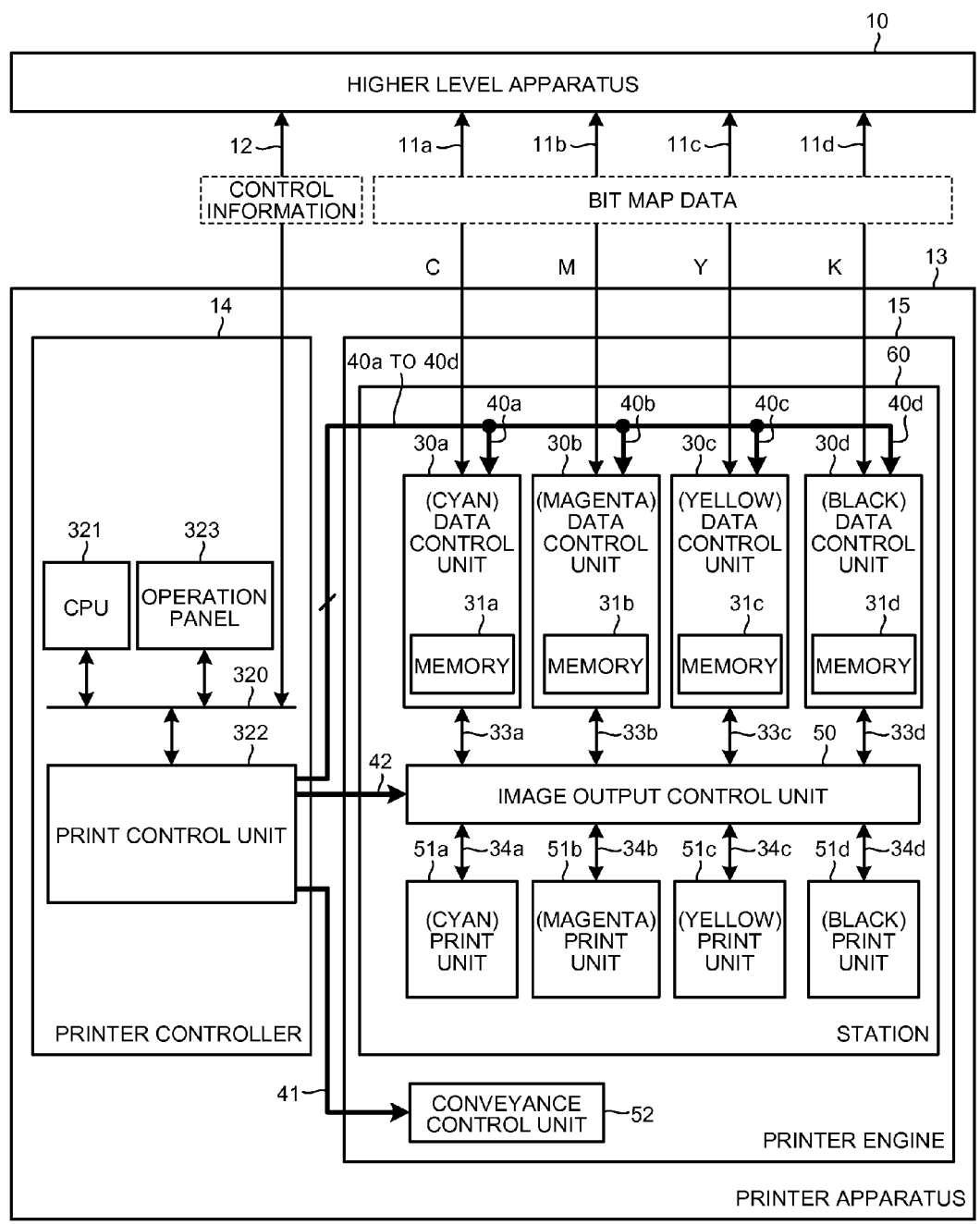
FIG. 3 is a block diagram illustrating an example of minimum configuration which is a first configuration of a printer apparatus according to an embodiment.

FIG. 3 illustrates an example of minimum configuration which is a first configuration of the printer apparatus 13 according to the embodiment. The printer apparatus 13 has a printer controller 14 and a printer engine 15. The printer controller 14 is connected to the control line 12, and controls print operation by exchanging control information with the higher level apparatus 10 via the control line 12. The printer engine 15 is connected to multiple data lines 11a, 11b, 11c and 11d, and in accordance with control of the printer controller 14, the printer engine 15 performs print processing with print image data (bit map data) of each color transferred from the higher level apparatus 10, via the data lines 11a, 11b, 11c and 11d.

The printer controller 14 and the printer engine 15 will be explained in more details. The printer controller 14 includes a CPU 321, a print control unit 322, and an operation panel 323. The CPU 321, the print control unit 322, and the operation panel 323 are connected to a bus 320 so as to be able to communicate with each other. The bus 320 is also connected to the control line 12 via a communication I/F, not illustrated. The CPU 321 operates using a RAM, not illustrated, as a work memory in accordance with a program stored in a ROM, not illustrated, and controls the entire operation of the printer apparatus 13.

The print control unit 322 is constituted by, for example, an ASIC (Application Specific Integrated Circuit), and in the print control unit 322, a microprocessor and multiple DMACs (Direct Memory Access Controller) are connected to be able to communicate with each other with the bus. The print control unit 322 is connected with data control units 30a, 30b, 30c and 30d explained later via engine I/F control lines 40a, 40b, 40c and 40d, respectively, and individually exchanges control signals with the data control units 30a, 30b, 30c and 30d. The engine I/F control lines 40a, 40b, 40c and 40d are also connected to an image output control unit 50.

The print control unit 322 is connected to a conveyance control unit 52 via a conveyance control line 41, and transmits and receives a control signal for controlling sheet conveyance to/from the conveyance control unit 52.

Further, the print control unit 322 and the image output control unit 50 are connected via a model switch control line 42, and the print control unit 322 provides model information to the image output control unit 50. The details of model information will be explained later.

In the printer apparatus 13 of the minimum configuration, the printer engine 15 includes a station 60 for performing print operation to a print sheet in accordance with print image data and a conveyance control unit 52 for controlling conveyance of the print sheet. The station 60 includes multiple data control units 30a, 30b, 30c and 30d of the same configuration, print units (image forming units) 51a, 51b, 51c and 51d, and an image output control unit 50.

Each of the print units 51a, 51b, 51c and 51d includes print ink of specified color, a head for ejecting ink, and a driving unit for driving the head, and forms an image by outputting the image based on the print image data onto a print sheet. In the minimum configuration, the print units 51a, 51b, 51c and 51d eject, for example, ink of colors, i.e., C (Cyan), M (Magenta), Y (Yellow), K (Black). The image output control unit 50 controls transfer to the print units 51a, 51b, 51c and 51d which are output from the data control units 30a, 30b, 30c and 30d. The detailed configuration of the image output control unit 50 will be explained later.

The data control units 30a, 30b, 30c and 30d are connected to the data lines 11a, 11b, 11c and 11d which transfer print image data of colors, i.e., C, M, Y, K. The data control units 30a, 30b, 30c and 30d include memories 31a, 31b, 31c and 31d, and stores print image data of each color transferred via the data lines 11a, 11b, 11c and 11d from the higher level apparatus 10 to the memories 31a, 31b, 31c and 31d.

The memories 31a, 31b, 31c and 31d have, for example, the same memory capacity and address configuration. Preferably, each of the memories 31a, 31b, 31c and 31d has a capacity so that at least three pages of print image data can be stored. The three pages of print image data correspond to, for example, print image data of a page being transferred from the higher level apparatus 10, print image data of a page that is being output, and print image data of a subsequent page. However, the embodiment is not limited thereto, each of the memories 31a, 31b, 31c and 31d may be able to store print image data of two pages or less.

Each of the memories 31a, 31b, 31c and 31d is collectively managed by the printer controller 14 with an input pointer and an output pointer. The input pointer indicates the initial address where image data are transferred to each of the memories 31a, 31b, 31c and 31d. The output pointer indicates the initial address where image data are output from each of the memories 31a, 31b, 31c and 31d.

Further, the data control units 30a, 30b, 30c and 30d are connected to the print control unit 322 of the printer controller 14 via the engine I/F control lines 40a, 40b, 40c and 40d. The print control unit 322 can transmit and receive control signals to/from the data control units 30a, 30b, 30c and 30d via the engine I/F control lines 40a, 40b, 40c and 40d, respectively.

The printer controller 14 and the conveyance control unit 52 for controlling conveyance of a print sheet are connected via the conveyance control line 41, and communication is performed between the printer controller 14 and the conveyance control unit 52. More specifically, the conveyance control unit 52 and the print control unit 322 in the printer controller 14 are connected via the conveyance control line 41, and communication is performed between the conveyance control unit 52 and the print control unit 322. The conveyance control unit 52 is connected with each data control units 30a to 30d via the conveyance control line 41.

Figure 4:
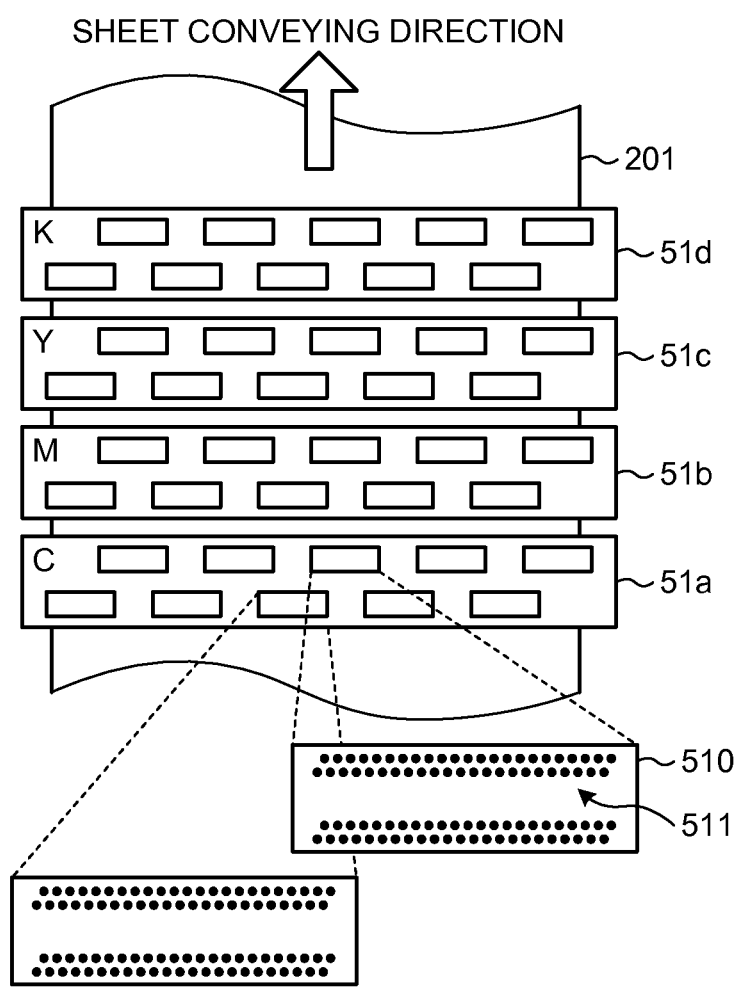
FIG. 4 is a schematic diagram illustrating an example of a head configuration with each print unit in an image output control unit.

FIG. 4 illustrates an example of a head configuration with the print units 51a, 51b, 51c and 51d in the image output control unit 50. For example, the print unit 51a is considered. In the print unit 51a, the head unit is configured such that nozzle blocks 510 including nozzle rows 511 including many nozzles arranged so as to eject ink with a predetermined pitch are arranged in a staggered manner with respect to a width direction of a print sheet 201. The nozzle blocks 510 are arranged in the head unit, so that the end portions of the nozzle rows 511 overlap each other in the movement direction of the print sheet 201. In the other print units 51b, 51c and 51d, the configuration of the head unit is also configured in the same manner as the print unit 51a.

In the example of FIG. 4, the print units 51a to 51d are arranged in the following order: the print units 51a, 51b, 51c, and 51d in the movement direction of the print sheet 201. Therefore, printing is performed on the print sheet 201 in the following order: the print units 51a, 51b, 51c, and 51d.

Conveying System of Print Sheet

Figure 5:
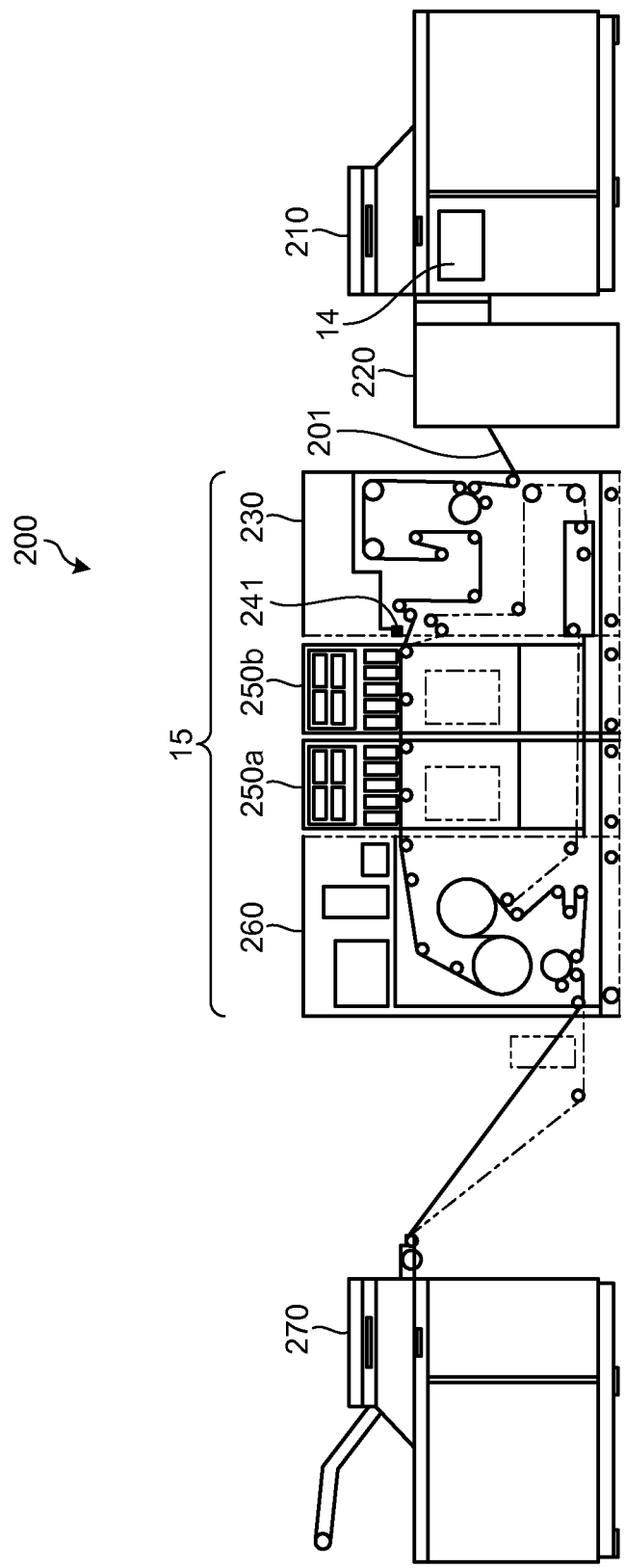
FIG. 5 is a schematic diagram schematically illustrating a structure of an example of a printer apparatus including a conveying system of a print medium, which can be applied to an embodiment.

The conveyance control unit 52 communicates with the printer controller 14 via the conveyance control line 41, and controls conveyance of the print medium on which an image based on print image data is formed by the print units 51a to 51d. FIG. 5 schematically illustrates a structure of an example of a printer apparatus 200 including a conveying system of a print medium, which can be applied to the embodiment. As already stated, the print sheet 201 used as a print medium in the printer apparatus 200 according to the present embodiment is fan-fold paper.

The print sheet 201 is fed from a print sheet feeding unit 210 including the printer controller 14, and is supplied to the printer engine 15 via a power supply operation box 220. The printer engine 15 includes a first conveying unit 230 and a second conveying unit 260 including the conveyance control unit 52, and also includes a station for forming an image based on print image data to the print sheet 201. In this example, the printer apparatus 200 includes multiple stations 250a and 250b.

In the printer engine 15, first, the print sheet 201 is provided to the first conveying unit 230, conveyed by means of multiple rollers, and is provided to the second conveying unit 260 by way of the stations 250a and 250b. In accordance with the control of the conveyance control unit 52, the second conveying unit 260 performs conveyance control of the provided print sheet 201. For example, the print sheet 201 is driven in a print direction (sheet feeding direction) by conveyance driving rollers provided in the second conveying unit 260, and a small amount of load in the opposite direction is given in the print direction in the first conveying unit 230, so that there is no slack in the print sheet 201.

A position sensor 241 is provided at the output side of the first conveying unit 230, and the print sheet 201 can be positioned with respect to the reference position. For example, if the print sheet 201 is fan-fold paper having perforations with a predetermined interval, positioning is performed so that the perforations are consistent with the reference position. The sheet can be positioned in the width direction by adjusting assignment of image data of a line for each nozzle of the nozzle row 511 in each head unit of the print units 51a, 51b, 51c and 51d.

The stations 250a and 250b include the same configuration as the station 60 explained above, and includes data control units 30a to 30d and an image output control unit 50, and performs printing on the print sheet 201 on the basis of the print image data. In the present embodiment, the stations 250a and 250b can be added in the printer apparatus 200. FIG. 5 schematically illustrates an example where the two stations 250a and 250b are connected to the printer apparatus 200. Each of the stations 250a and 250b is identified by the printer controller 14 on the basis of identification information which is output from an identification unit, not illustrated.

In this case, the relationship of position of the reference position and the position of each of multiple stations (in the example of FIG. 5, the stations 250a and 250b) is required to be in a fixed manner. When the stations are configured to be added to the printer apparatus 200, each station is preferably a configuration independent from the printer apparatus 200.

Figure 6:
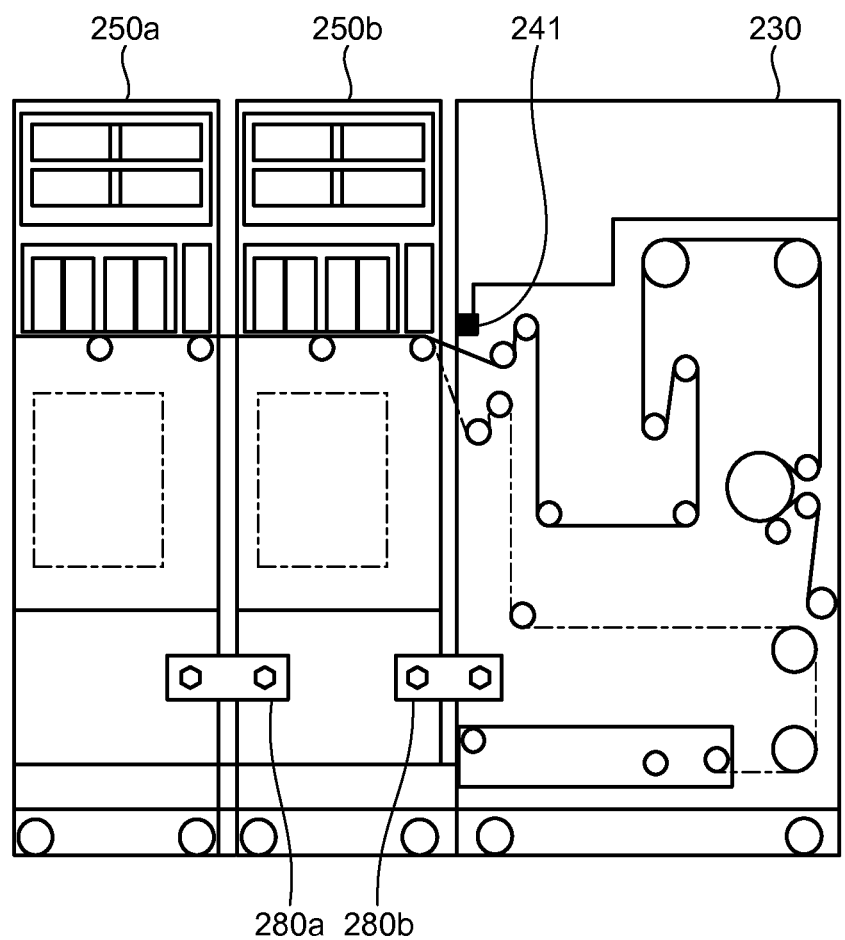
FIG. 6 is a schematic diagram illustrating an example where a first conveying unit and multiple stations are respectively coupled using coupling devices.

For example, the first conveying unit 230 having the reference position and each station may be coupled using coupling devices. FIG. 6 illustrates an example where the first conveying unit 230, the station 250a, and the station 250b are respectively coupled using coupling devices 280a and 280b. The coupling device 280a and the coupling device 280b are attached to the station 250a, the station 250b, and the first conveying unit 230 using, e.g., joining components such as bolts and nuts. Accordingly, the relationship of position can be fixed between the reference position, the station 250a, and the station 250b.

It should be noted that the embodiment is not limited to the above example, and the first conveying unit 230, the station 250a, and the station 250b are coupled with each other using coupling devices using latch mechanism and the like, so that the relationship of position may be fixed between the reference position, the station 250a, and the station 250b.

The stations 250a and 250b and the second conveying unit 260 are connected with the printer controller 14 with a predetermined cable (not illustrated). Communication of the engine I/F control lines 40a to 40d and the model switch control line 42 and communication of the conveyance control line 41 is performed via this cable. The stations 250a and 250b are connected to a higher level apparatus 10, not illustrated, via the cable and printer controller 14, and image data of each color are transferred via the data lines 11a to 11d.

The printed print sheet 201 is discharged from the second conveying unit 260, and is provided to a cutting unit 270. The printed print sheet 201 is cut along the perforations by the cutting unit 270, so that the pages are separated.

In this case, the printer apparatus 200 performs printing on the print sheet 201 which is fan-fold paper of which pages are continuous, and therefore, the print sheet 201 exists throughout the path without interruption from the point where printing is performed to the print sheet 201 in the stations 250a and 250b, all the way to the point where the print sheet 201 is discharged from the second conveying unit 260.

It should be noted that, it is possible to prepare another set of configuration including the first conveying unit 230, the stations 250a and 250b, and the second conveying unit 260, and in this case, it is possible to print both sides of the print sheet 201 by reversing the front side and the back side of the printed print sheet 201 discharged from the second conveying unit 260 at the front side, and then providing the reversed print sheet 201 to the first conveying unit 230 at the rear side.

Details of Print Processing that can be Applied to Embodiment

Subsequently, the print processing that can be applied to each embodiment will be explained in detail. FIG. 7 illustrates an example of control information transmitted and received via the control line 12 between the higher level apparatus 10 and the printer controller 14 of the printer apparatus 13. In FIG. 7, the higher level apparatus 10 is denoted as a DFE (digital front end processor), and the printer controller 14 is denoted as a PCTL. The control information roughly includes (1) job (JOB) information, (2) information indicating printer state and print process, (3) information indicating print condition, and (4) information indicating connection.

The (1) job information notifies job (JOB) start and job end. The job start includes a notification of job start transmitted from the higher level apparatus 10 to the printer controller 14 and a response transmitted from the printer apparatus 13 to the higher level apparatus 10 in response to the notification. The job start includes information about image data, which are to be printed, notified by the job start. The job end includes a notification of an end of all the print processes requested by the job start, which is transmitted from the higher level apparatus 10 to the printer controller 14, and a response transmitted from the printer controller 14 to higher level apparatus 10 in response to the notification. At the response of the job start and the job end, a job identifier for identifying a job (JOBID) is transmitted from the printer controller 14 to the higher level apparatus 10.

Information indicating the print process and the (2) printer state notifies a print process reception start, a request and notification of printer information, a print process start, a print process request, a data transfer completion, a data reception completion, a print process completion, a process state report, an SC (Service Control) notification, and an error occurrence and cancellation.

The print process reception start is to notify, from the printer apparatus 13 to the higher level apparatus 10, that the printer controller 14 is ready to receive the print process. The request and notification of the printer information includes a request of required printer information which is transmitted from the higher level apparatus 10 to the printer controller 14 and a response transmitted from the printer controller 14 to the higher level apparatus 10 in response to the request.

The print process start includes a notification, transmitted from the higher level apparatus 10 to the printer controller 14, indicating that preparation of the print image data is completed, and a response transmitted from the printer apparatus 13 to the higher level apparatus 10 in response to the notification. The preparation completion notification of print image data is given in units of pages (processes) in the order of output of the print image data. A page can be said to be a print unit with which printing is performed in a series of print operation.

The print process request includes a notification of print process transmitted from the printer controller 14 to the higher level apparatus 10 and a response transmitted from the higher level apparatus 10 to the printer controller 14 in response to the notification. In response to the print process request, the printer controller 14 notifies the higher level apparatus 10 of color information (yellow, cyan, magenta or black) indicating colors Y, C, M and K used for printing, a process identification number process ID, and a plane identification number. It should be noted that a plane corresponds to an image of print image data of each color printed on a page. The printer controller 14 notifies the information in accordance with the plane unit and engine, i.e., in accordance with the order of request of the data control units 30a, 30b, 30c and 30d. More specifically, the print image data including the bit map data are obtained by the printer engine 15 from the higher level apparatus 10.

The data transfer completion notifies transfer completion of print image data of the plane of which request is given by the higher level apparatus 10 to the printer controller 14. The data reception completion notifies reception completion of print image data of the plane requested, which is transmitted from the printer controller 14 to the higher level apparatus 10. The print process completion notifies completion of the print request of all pages (processes), transmitted from the higher level apparatus 10 to the printer controller 14. The process state report notifies the print state of page (process), which is transmitted from the printer controller 14 to the higher level apparatus 10. At this occasion, the printer controller 14 obtains information about sheet feeding, sheet discharge and print start from the printer engine 15, adds the obtained information to the notification, and transmits the notification to the higher level apparatus 10.

The SC notification requests to obtain failure information of the printer apparatus 13, transmitted from the higher level apparatus 10 to the printer controller 14, and notifies failure information obtained in response to the request, transmitted from the printer controller 14 to the higher level apparatus 10. The error occurrence and cancellation notifies error occurrence and cancellation of the error at the side of the higher level apparatus 10, which is transmitted from the higher level apparatus 10 to the printer controller 14.

Information indicating the (3) print condition includes a notification of setting of print condition, i.e., print condition, which is transmitted from the higher level apparatus 10 to the printer controller 14, and a response of printer controller 14 to the notification. Examples of print conditions include print mode, print type, sheet feeding/discharge information, print surface order, print sheet size, print data size, resolution and gradation, color information, and the like.

The print mode indicates, for example, whether both sides of the print sheet 201 are printed or one side thereof is printed. The print type indicates whether print image data exist and the print image data are printed or print image data do not exist and white sheet page is made. The sheet feeding/discharge information indicates identification information of a stacker and the like from which the print sheets 201 are fed and to which the print sheets 201 are discharged. The print surface order indicates whether the print sheet 201 is printed from the front side to the back side or from the back side to the front side. The print sheet size indicates the length of the print sheet 201 of pages to be printed in the conveyance direction, when, for example, fan-fold paper is used as a print sheet 201. The print data size indicates the data size of the print image data. More specifically, the print data size indicates the size of print image data for one page. The resolution and gradation indicates a resolution and gradation when the print image data are printed to the print sheet 201. The color information indicates whether, for example, printing is performed with full color using colors, i.e., C, M, Y, K, or printing is performed with a single color using only color K.

Information indicating the (4) connection includes registration and cancellation, and each of the higher level apparatus 10 and the printer controller 14 registers information of each other and cancels the registered information.

Print Sequence

Subsequently, print processing which can be applied to the embodiment will be explained. FIG. 8 is a sequence diagram of an example schematically illustrating print processing according to the present embodiment. In this case, full color printing is performed using colors C, M, Y and K. When the print control unit 322 receives information about the print sheet 201 as control information from the higher level apparatus 10 (SEQ100), the print control unit 322 sets the sheet feeding length with the conveyance control unit 52 on the basis of the received information (SEQ103). The sheet feeding length is, for example, the size of a page in the conveyance direction.

When the print control unit 322 receives control information indicating the job start of the first page (page #1) from the higher level apparatus 10 (SEQ101), the print control unit 322 requests the data control units 30a, 30b, 30c and 30d to start data transfer of the first page of the colors C, M, Y and K, respectively (SEQ110a, SEQ110b, SEQ110c and SEQ110d). In accordance with the request, the data control unit 30a requests the higher level apparatus 10 via the data line 11a to transmit print image data of the first page of the color C, and the print image data of the first page of the color C transferred from the higher level apparatus 10 in accordance with the request are stored to a memory 31a.

Likewise, the data control units 30b, 30c and 30d request the higher level apparatus 10 via the data lines 11b, 11c and 11d, respectively, to transmit print image data of the first page of the colors M, Y and K, respectively, in accordance with the requests of SEQ110b, SEQ110c and SEQ110d. The data control units 30b, 30c and 30d stores the print image data of the first page of the colors M, Y and K transferred from the higher level apparatus 10 in accordance with the request to the memories 31b, 31c and 31d.

On the other hand, in the example of FIG. 8, while the print control unit 322 requests the data control units 30a, 30b, 30c and 30d to perform data transfer of the first page, the print control unit 322 receives control information indicating job start of a subsequent page, i.e., the second page, transmitted from the higher level apparatus 10 (SEQ102). The received print job is held in a memory, not illustrated.

When the transfer of the print image data of the first page of each color from the higher level apparatus 10 is finished, the data control units 30*a*, 30*b*, 30*c* and 30*d* notifies the print control unit 322 to that effect (SEQ111*a*, SEQ111*b*, SEQ111*c* and SEQ111*d*). In response to the notifications, the print control unit 322 requests the data control units 30*a*, 30*b*, 30*c* and 30*d* to start data transfer of the second page (page #2) (SEQ112*a*, SEQ112*b*, SEQ112*c* and 112*d*).

In response to the request, the data control units 30*a*, 30*b*, 30*c* and 30*d* requests the higher level apparatus 10 to transmit the print image data of the second page of each color, and stores the print image data of the second page of each color transferred from the higher level apparatus 10 in accordance with the request to the memories 31*a*, 31*b*, 31*c* and 31*d*, respectively.

It should be noted that the data control units 30*a*, 30*b*, 30*c* and 30*d* can find the finish of the data transfer on the basis of the amount of data of print image data transferred. Information indicating the amount of data of print image of one page is added to the head of the print image data and is transmitted by the higher level apparatus 10, at the start of data transfer to the data control units 30*a*, 30*b*, 30*c* and 30*d*, for example. When the print image data are transferred in predetermined units, the higher level apparatus 10 may add end information indicating the end of transfer of one page for a transfer unit of print image data of the final print image data of one page. Further, immediately after the transfer of print image data of one page, the higher level apparatus 10 may transmit, separately from the print image data, information indicating the end of the transfer of print image data of one page to the data control units 30*a*, 30*b*, 30*c* and 30*d*.

On the other hand, when the print control unit 322 receives the notification of the end of the data transfer of one page from all of the data control units 30*a*, 30*b*, 30*c* and 30*d*, the print control unit 322 requests the conveyance control unit 52 to convey sheet (SEQ113). In response to the request, the conveyance control unit 52 starts conveying the print sheet 201 at a predetermined speed. The print control unit 322 requests the conveyance control unit 52 to start conveying sheet, and in addition, instructs the data control units 30*a*, 30*b*, 30*c* and 30*d* to start printing of the first page (SEQ114).

For example, when the print sheet 201 reaches the predetermined position, the conveyance control unit 52 notifies the printable state to the print control unit 322 (SEQ117). The print control unit 322 informs each of the data control units 30*a*, 30*b*, 30*c* and 30*d* of the head position of printing, in accordance with the printable state report given from the conveyance control unit 52 (SEQ118).

Each of the data control units 30*a*, 30*b*, 30*c* and 30*d* starts printing in accordance with the print head instruction. In the embodiment, the print units 51*a* to 51*d* are arranged along the conveyance direction of the print sheet 201 in the following order: the colors C, M, Y and K. In this case, when the head position of the first page of the print sheet 201 reaches the print position of a head 56*a*, first, the data control unit 30*a* starts reading print image data of the first page from the memory 31*a*. The print image data of the color C read from the memory 31*a* are transferred to the image output control unit 50, and are provided from the image output control unit 50 to the print unit 51*a*, and the print sheet 201 is printed (SEQ119*a*). When the first page in the color C has been printed, the print control unit 322 is notified to that effect (SEQ120*a*).

Subsequently, when the head position of the printing of the first page of the print sheet 201 reaches the print position of a head 56*b*, the data control unit 30*b* starts reading the print image data of the first page from the memory 31*b*. The print image data of the color M read from the memory 31*b* are transferred to the image output control unit 50, and are provided from the image output control unit 50 to the print unit 51*b*, and the print sheet 201 is printed (SEQ119*b*). When the first page in the color M has been printed, the print control unit 322 is notified to that effect (SEQ120*b*).

Likewise, printing in the colors Y and K is started in order (SEQ119*c*, SEQ119*d*), and when the printing is finished, the print control unit 322 is notified to that effect (SEQ120*c* and SEQ120*d*).

On the other hand, when the transfer of the print image data of the second page started in SEQ112*a* to SEQ112*d* explained above is finished, the data control units 30*a*, 30*b*, 30*c* and 30*d* notifies the print control unit 322 to that effect (SEQ115). In response to the notification of the data transfer completion, the print control unit 322 instructs each of the data control units 30*a*, 30*b*, 30*c* and 30*d* to start printing of the second page (SEQ116).

Each of the data control units 30*a*, 30*b*, 30*c* and 30*d* starts printing of the second page, after the first page is printed. For example, when, after the first page has been printed (SEQ120*a*), the head position of the printing of the second page of the print sheet 201 reaches the print position of the head of the print unit 51*a*, the data control unit 30*a* reads the print image data of the color M of the second page from the memory 31*a* and provides the print image data to the image output control unit 50, thus starting printing of the print sheet 201 (SEQ121*a*). When the printing in the color M has been finished, the print control unit 322 is notified to that effect (SEQ122*a*).

Likewise, when the head position of the second page reaches the print position of each head of the print units 51*b*, 51*c* and 51*d*, when the data control units 30*b*, 30*c* and 30*d* read the print image data of each color from the memories 31*b*, 31*c* and 31*d*, and starts printing onto the print sheet 201 (SEQ121*b* to SEQ121*d*). When printing in each color is finished, the print control unit 322 is notified to that effect (SEQ122*b* to SEQ122*d*).

When the print control unit 322 receives the print end notification of the color K of the second page from the data control unit 30*d*, it is considered that the printing of the final page based on the print job is finished, and the conveyance control unit 52 is requested to stop conveying the print sheet 201 (SEQ123). The conveyance control unit 52 stops conveying of the print sheet 201 in accordance with the request, the print control unit 322 is notified to that effect (SEQ124). Accordingly, a series of print processing is finished.

Configuration of Station

Figure 9:
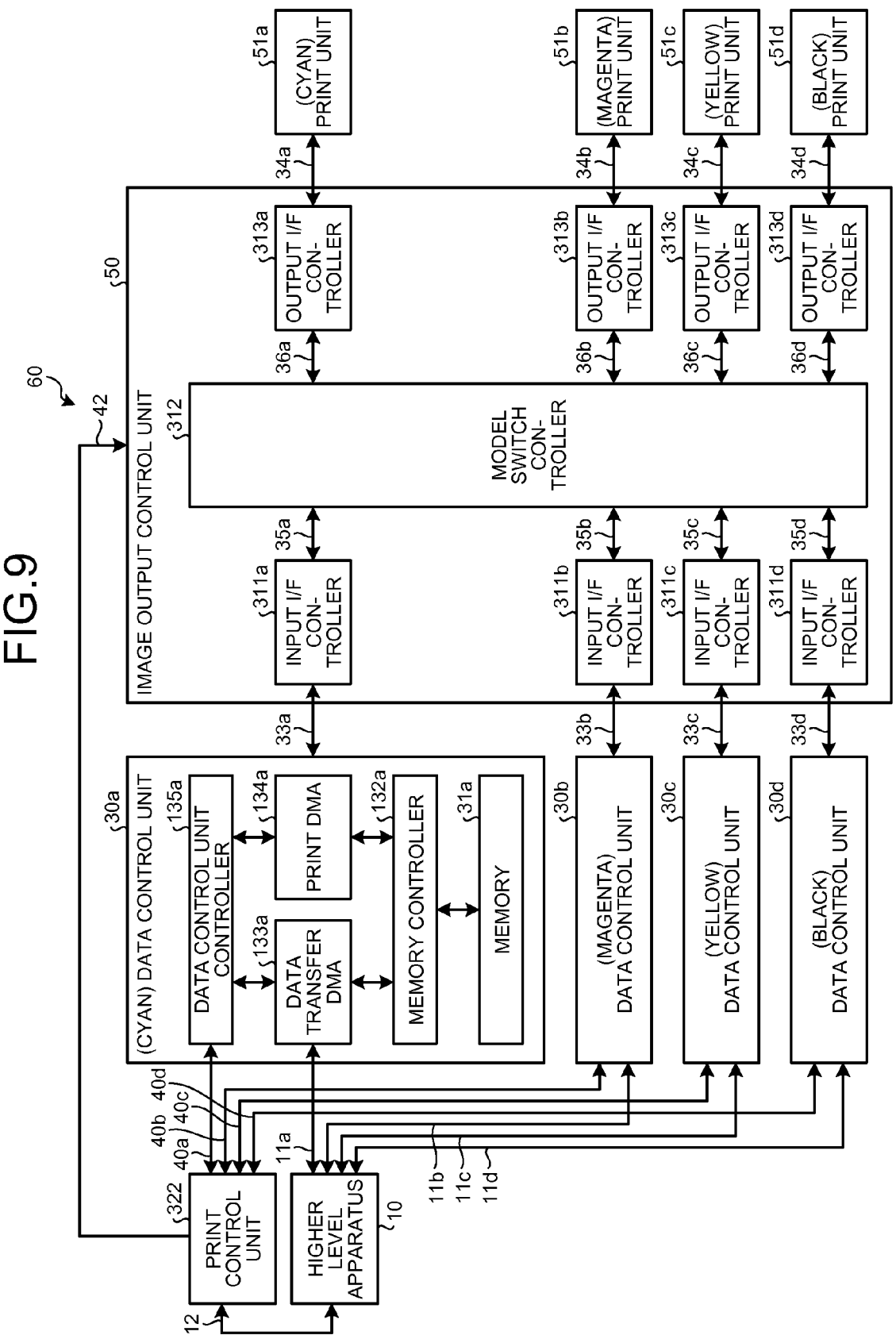
FIG. 9 is a block diagram illustrating a configuration of an example of a station in more details.

Subsequently, the configuration of the printer apparatus 13 according to the present embodiment will be explained in more details. FIG. 9 illustrates a configuration of an example of the station 60 in more details. In FIG. 9, the same portions as those of FIG. 3 are denoted with the same reference numerals, and detailed description thereabout is omitted.

The data control unit 30*a* includes a memory 31*a*, a memory controller 132*a*, a data transfer DMA (Direct Memory Access) 133*a*, a print DMA 134*a*, and a data control unit controller 135*a*.

The memory controller 132*a* controls access to the memory 31*a*. The data transfer DMA 133*a* receives print image data from the higher level apparatus 10, and writes the print image data via the memory controller 132*a* to the memory 31*a*. The print DMA 134*a* reads data via the memory controller 132*a* from the memory 31*a*, and transfers the data via the data line 33*a* to the image output control unit 50. The data control unit controller 135*a* receives control information transmitted from the print control unit 322 via the engine I/F control line 40a, and controls the data transfer DMA 133a and the print DMA 134a in accordance with the received control information.

For example, when the start request of the data transfer transmitted from the print control unit 322 is received via the engine I/F control line 40a by the data control unit controller 135a, the data control unit controller 135a instructs the data transfer DMA 133a to start the data transfer in accordance with the request. In accordance with the instruction, the data transfer DMA 133a transmits the data transfer request via the data line 11a to the higher level apparatus 10. The data transmitted from the higher level apparatus 10 in accordance with the request are, for example, received by the data transfer DMA 133a, and are written via the memory controller 132a to a predetermined address of the memory 31a.

The print instruction transmitted from the print control unit 322 is received via the engine I/F control line 40a by the data control unit controller 135a, the data control unit controller 135a instructs the print DMA 134a to read data from the memory 31a. In response to the instruction, the print DMA 134a reads data via the memory controller 132a from the memory 31a. Then, the print DMA 134a transfers the read data via the data line 33a to the image output control unit 50.

It should be noted that the data control units 30b, 30c and 30d have the same configuration as the data control unit 30a, and detailed description thereabout is omitted.

The image output control unit 50 includes a model switch controller 312, input I/F controllers 311a, 311b, 311c and 311d respectively corresponding to the data control units 30a, 30b, 30c and 30d, and output I/F controllers 313a, 313b, 313c and 313d respectively corresponding to the print units 51a, 51b, 51c and 51d.

The print image data which are output from the data control units 30a, 30b, 30c and 30d are input into the input I/F controllers 311a, 311b, 311c and 311d, respectively, and are provided via data lines 35a, 35b, 35c and 35d to the model switch controller 312.

The print image data are output via data lines 36a, 36b, 36c and 36d from the model switch controller 312, and are provided to the output I/F controllers 313a, 313b, 313c and 313d. The output I/F controllers 313a, 313b, 313c and 313d provides the provided print image data via data lines 34a, 34b, 34c and 34d, respectively, to the print units 51a, 51b, 51c and 51d, respectively.

The print control unit 322 transmits model information, which is provided via the model switch control line 42 to the model switch controller 312. In accordance with the model information, the model switch controller 312 selects connection path between the input I/F controllers 311a, 311b, 311c and 311d and the output I/F controllers 313a, 313b, 313c and 313d.

Figure 10:
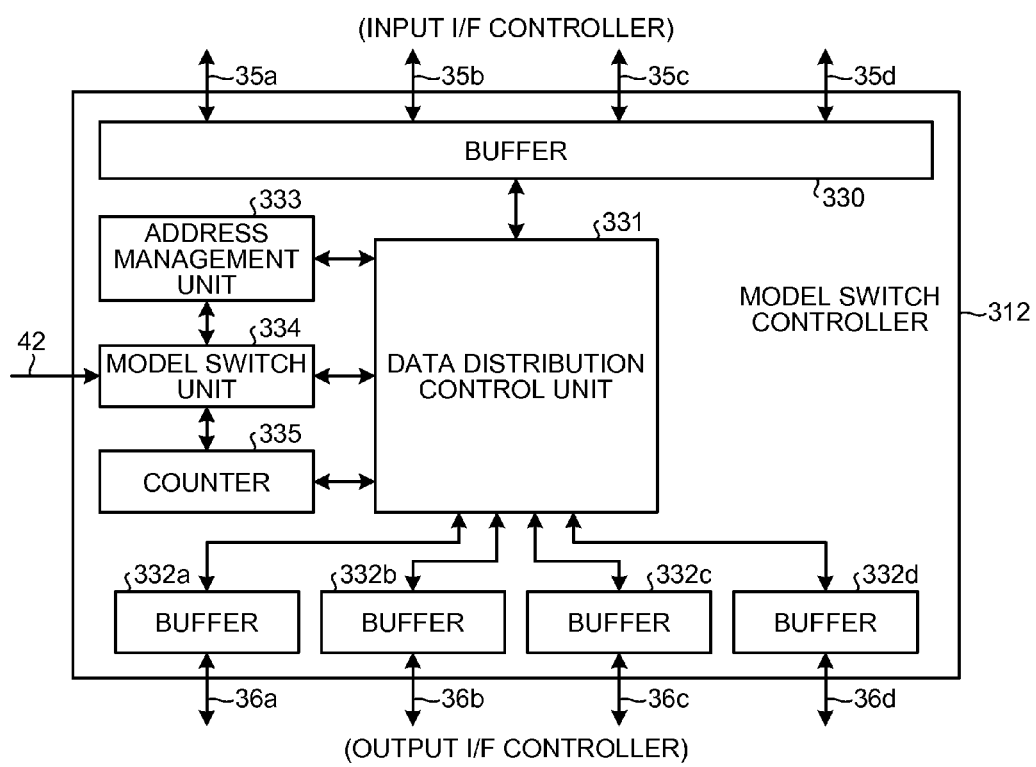
FIG. 10 is a block diagram illustrating a configuration of an example of a model switch controller in more details.

FIG. 10 illustrates a configuration of an example of the model switch controller 312 in more details. The model switch controller 312 includes a buffer 330, a data distribution control unit 331, buffers 332a, 332b, 332c and 332d, an address management unit 333, model switch unit 334, and a counter 335.

The same image output control unit 50 is commonly used by each model of the printer engine 15. Therefore, the model switch controller 312 is also configured the same in each model. For example, when the printer apparatus 13 is activated, the model switch controller 312 sets, in a register and the like, model information indicating the model of the printer engine 15 of the printer apparatus 13 to which the model switch controller 312 belongs, and by looking up this model information, the internal control is switched to support the model of the printer engine 15.

The data lines 35a, 35b, 35c and 35d are connected to the buffer 330, and the print image data which are output from the input I/F controllers 311a, 311b, 311c and 311d are stored to the buffer 330. The address of each piece of print image data in the buffer 330 is obtained via the data distribution control unit 331 by the address management unit 333. The address management unit 333 obtains and manages the address and the size of the print image data stored in each of the buffers 332a, 332b, 332c and 332d via the data distribution control unit 331.

The model information transmitted from the print control unit 322 is provided via the model switch control line 42 to the model switch unit 334, and is written to a register and the like, so that the model information is set in the model switch unit 334. The model switch unit 334 looks up the model information thus written to the register, and provides parameters, which are different for each of the models, to the data distribution control unit 331, the address management unit 333, and the counter 335.

The counter 335 is connected to the engine I/F control lines 40a, 40b, 40c and 40d, and the print control unit 322 transmits control signals including print head instructions via the engine I/F control lines 40a, 40b, 40c and 40d. Upon receipt of the print head instruction, the counter 335 starts counting, and when the counted value attains a predetermined value, the print image data are read and output from the buffers 332a, 332b, 332c and 332d. The print image data which are output from the buffers 332a, 332b, 332c and 332d are provided via the data lines 36a, 36b, 36c and 36d to the print units 51a, 51b, 51c and 51d, respectively.

The data distribution control unit 331 identifies the order of the path and the print of the print image data determined in advance by the model of the printer engine 15, in accordance with the parameter provided when the model switch unit 334 looks up the model information. Then, raster data are obtained from the print image data stored in the buffer 330 in the order of printing identified by the parameter, and in accordance with the path identified by the parameter in the same manner, the raster data are provided to the buffers 332a, 332b, 332c and 332d.

Details of First Configuration According to Embodiment

In FIG. 3 explained above, the first configuration is illustrated in which the printer engine 15 includes the station 60. As mentioned above, the present embodiment may be configured to make a printer apparatus 13 having multiple stations 60 by adding a station 60 to the printer engine 15.

More specifically, in the present embodiment, in each station 60, in accordance with an image output setting information table transferred from the print control unit 322 to the image output control unit 50, the image output control unit 50 functions as a selection unit that selects transfer paths for transferring the print image data read from the data control units 30a to 30d to the print units 51a to 51d. In each station 60, from the print control unit 322 to each of the data control units 30a, 30b, 30c and 30d, operation of the data control units 30a to 30d is controlled in accordance with the data control setting information table.

In the first configuration, as illustrated in FIG. 3, the image output control unit 50 selects transfer paths so that the print image data read from the data control units 30a to 30d are transferred to the print units 51a to 51d. The data control units 30a to 30d are used.

Models, i.e., minimum configuration model, middle configuration model (second configuration) and maximum configuration model (third configuration) of the printer engine 15 will be explained with regard to a method of identification by the print control unit 322 and the printer engine 15. Input means of model information indicating each model may be a dip switch and the like provided on the printer controller 14 or the printer engine 15. The model information may also be input by user operation with the operation panel 323.

In the present embodiment, the model information is input by user operation with the operation panel 323. For example, after the printer apparatus 13 is activated, the model information is input by user operation with the operation panel 323. The model information thus input is read by the CPU 321 in accordance with a program running on the CPU 321. On the basis of the model information, the CPU 321 generates an image output setting information table for setting model information and the like in the image output control unit 50 and a data control setting information table for setting model information and the like in the data control units 30a, 30b, 30c and 30d.

FIG. 11 illustrates an example of a data control setting information table in a minimum configuration model. Items for setting in the data control units 30a, 30b, 30c and 30d are divided into common items and data control unit-dependent item.

The common item is an item set commonly for each station. In this example, the common items include the number of stations, a position number of a station, and the number of data control units per station, which are set as the common items. The number of stations indicates the number of stations provided in the printer engine 15, and in the minimum configuration, this is "1". The position numbers of stations are allocated in order such that a smaller number is allocated to a station arranged at a position closer to the printer controller 14 in the printer engine 15, for example. In the minimum configuration, only one station 60 is provided, and accordingly, the position number is "1". In this example, the number of data control units per station is "4".

The station 60 can find the position of the station 60 from the setting of a dip switch provided in the station 60, for example.

On the other hand, in the data control unit-dependent items, a number of a data control unit and a color handled by the data control unit corresponding to the number are associated with each other. In this example, like the station position number, the numbers of the data control units are allocated in order such that a smaller number is allocated to a data control unit arranged at a position closer to the printer controller 14, for example.

In the example of FIG. 11, the data control unit of the number "1" arranged at the position closest to the printer controller 14 is defined as handling the color C. Hereinafter, the data control unit of the number "2" is defined as handling the color M, the data control unit of the number "3" is defined as handling the color Y, and the data control unit of the number "4" is defined as handling the color K, which are arranged away from the printer controller 14 in this order.

In the minimum configuration, the number of data control units per stations is "4" according to the value of the item of the number of stations in the common item, and therefore, it is defined that one station has four data control units represented as the numbers "1", "2", "3", and "4". More specifically, the data control units of the numbers "1", "2", "3" and "4" are the data control units 30a, 30b, 30c and 30d, respectively, of the station 60, and are configured to handle print image data in color C, color M, color Y and color K, respectively.

FIG. 12 illustrates an example of an image output setting information table in the minimum configuration model. Like the data control setting information table, the items set in the image output control unit 50 are divided into the common items and the image output control unit-dependent items.

The common item is an item set commonly for each station. In this example, the common items include the number of input I/F controllers and the position number of a station, which are set as the common items. The number of input I/F controllers is set as the number of input I/F controllers provided in each station. In this example, the station 60 includes four input I/F controllers, i.e., the input I/F controllers 311a, 311b, 311c and 311d, and accordingly, the number of input I/F controllers is "4". The position number of the station is the same as the position number of the station in the data control setting information table explained above.

On the other hand, color information indicating the color handled by each print unit is set as the image output control unit-dependent item. In this example where the station 60 is provided, it is defined that color C, color M, color Y, and color K are allocated to four print units, i.e., print units #1 to #4 provided in the image output control unit of the position number "1". More specifically, the print units #1, #2, #3 and #4 correspond to the print units 51a, 51b, 51c and 51d, respectively. The color C is allocated to the print unit 51a, the color M is allocated to the print unit 51b, the color Y is allocated to the print unit 51c, and the color K is allocated to the print unit 51d.

The image output setting information table and the data control setting information table thus generated are provided to the print control unit 322. For example, when the printer apparatus 13 is activated, the print control unit 322 transmits the image output setting information table via the model switch control line 42 to the image output control unit 50, and transmits the data control setting information table via the engine I/F control lines 40a to 40d to the data control units 30a to 30d, respectively.

The model switch control line 42 may be omitted, and the image output setting information table may be transmitted via the engine I/F control lines 40a, 40b, 40c and 40d to the data control units 30a, 30b, 30c and 30d, and may be provided to the image output control unit 50 from the data control units 30a, 30b, 30c and 30d.

In the station 60, the received image output control setting information table is provided to the model switch controller 312. In the model switch controller 312, the model information is set in the model switch unit 334 on the basis of the image output control setting information table. On the basis of the model information, the model switch controller 312 identifies the model configuration of the printer engine 15, and selects a path of print image data of each color.

For example, the image output control unit 50 finds, on the basis of the item "2" of the image output setting information table, that the position of the station 60 to which the image output control unit 50 belongs is at the position closest to the printer controller 14. On the basis of the item "1", it is found that, in the current mode, all of the four input I/F controllers 311a to 311d provided therein are used. More specifically, the image output control unit 50 finds that the print image data are input into the input I/F controllers 311a, 311b, 311c and 311d. Further, the image output control unit 50 finds, from the items "3" to "6", that the print units 51a to 51d performs printing in the colors C, M, Y, K which are different from each other.

Therefore, the image output control unit 50 controls the data distribution control unit 331 so as to select paths so that the print image data which are input into the input I/F controllers 311a, 311b, 311c and 311d are provided to the print units 51a, 51b, 51c and 51d, respectively.

The data control setting information table is written to registers provided in the data control units 30a, 30b, 30c and 30d. The data control units 30a, 30b, 30c and 30d look up the data control setting information table written to the registers, thus capable of identifying the model configuration of the printer engine 15.

For example, when the data control unit 30a is considered, the data control unit 30a finds, from the items "1" and "2" of the data control setting information table, that the position of the station 60 to which the data control unit 30a belongs is at the position closest to the printer controller 14, and that the printer engine 15 has one station 60. The item "3" indicates that the station 60 to which it belongs includes four data control units, i.e., the data control units 30a, 30b, 30c and 30d.

Further, the items "4" to "7" indicate that the four data control units 30a, 30b, 30c and 30d handle print image data of the colors C, M, Y, K, respectively. The data control unit 30a knows the position of itself within the station 60 on the basis of, for example, a value and the like written in advance to ROM, not illustrated, and setting of a dip switch, and therefore, finds that the data control unit 30a is the item "4", the data control unit "1", and finds that the print image data of the color C is to be handled.

Figure 13:
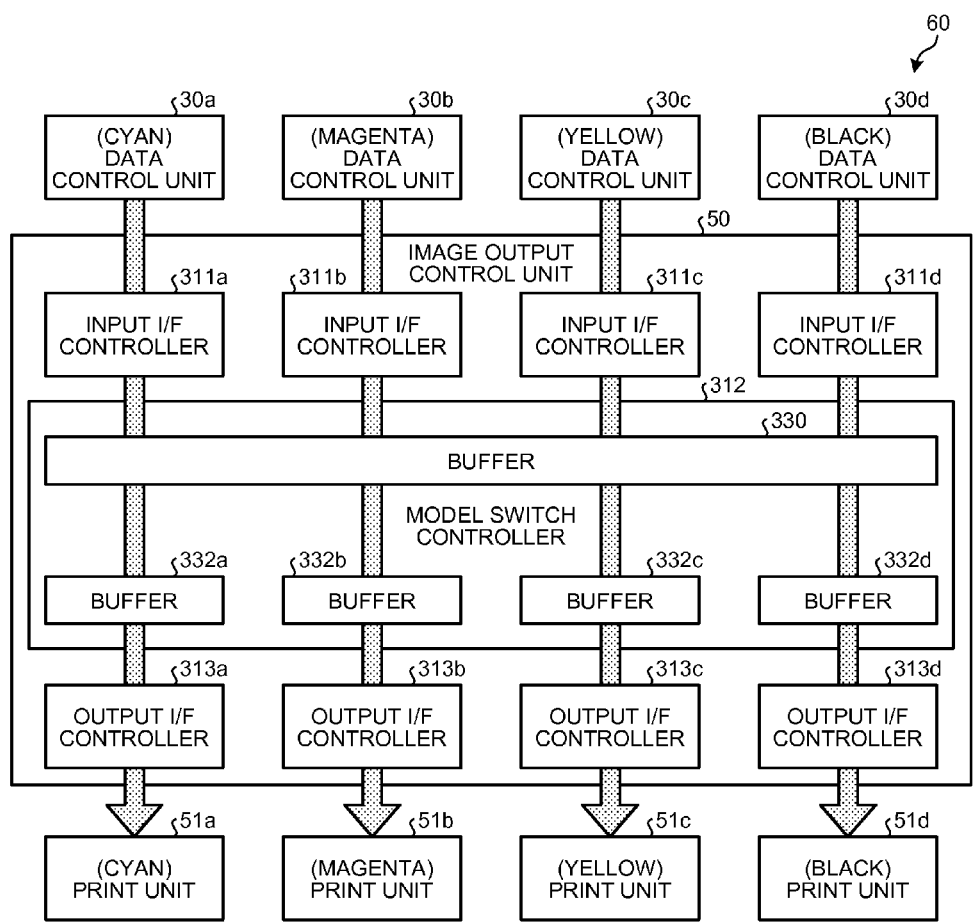
FIG. 13 is a schematic diagram schematically illustrating a flow of print image data from each data control unit to a print unit in a minimum configuration model.

FIG. 13 schematically illustrates a flow of print image data from the data control units 30a to 30d to the print units 51a to 51d in the station 60 in the minimum configuration model as illustrated in FIG. 3. In FIG. 13, the same portions as those of FIGS. 9 and 10 are denoted with the same reference numerals, and detailed description thereabout is omitted.

In the minimum configuration model, the printer engine 15 includes one station 60, and the station 60 uses the print units 51a, 51b, 51c and 51d to print a print medium on the basis of print image data of the colors, i.e., C, M, Y, K transferred from the higher level apparatus 10. The print image data of the colors, i.e., C, M, Y, K are transferred from the higher level apparatus 10 to the data control units 30a, 30b, 30c and 30d, and are input into the input I/F controllers 311a, 311b, 311c and 311d, respectively. The print image data of the colors, i.e., C, M, Y, K which are input into the input I/F controllers 311a, 311b, 311c and 311d are stored to the buffer 330 in the model switch controller 312.

In this case, the model switch controller 312 can recognize that the printing of the print image data of the colors, i.e., C, M, Y, K are performed with one of the print units 51a, 51b, 51c and 51d, on the basis of the model information set in the model switch unit 334. Therefore, the model switch unit 334 controls the data distribution control unit 331 to store the print image data of the colors, i.e., C, M, Y, K, read from the buffer 330 into the buffers 332a, 332b, 332c and 332d, respectively. At this occasion, each piece of the print image data of the colors, i.e., C, M, Y, K is preferably reconstructed in an order suitable for high speed printing and stored to the buffers 332a, 332b, 332c and 332d.

The model switch controller 312 measures print timing on the basis of the counted value of the counter 335 started upon the print head instruction transmitted in synchronization with the sheet conveyance from the print control unit 322, and when the print timing is attained, the print image data of the colors, i.e., C, M, Y, K, are read from the buffers 332a, 332b, 332c and 332d, respectively. The print image data of the colors, i.e., C, M, Y, K, thus read are provided via the output I/F controllers 313a, 313b, 313c and 313d to the print units 51a, 51b, 51c and 51d, respectively, and are printed.

Operation of Station

Figure 14:
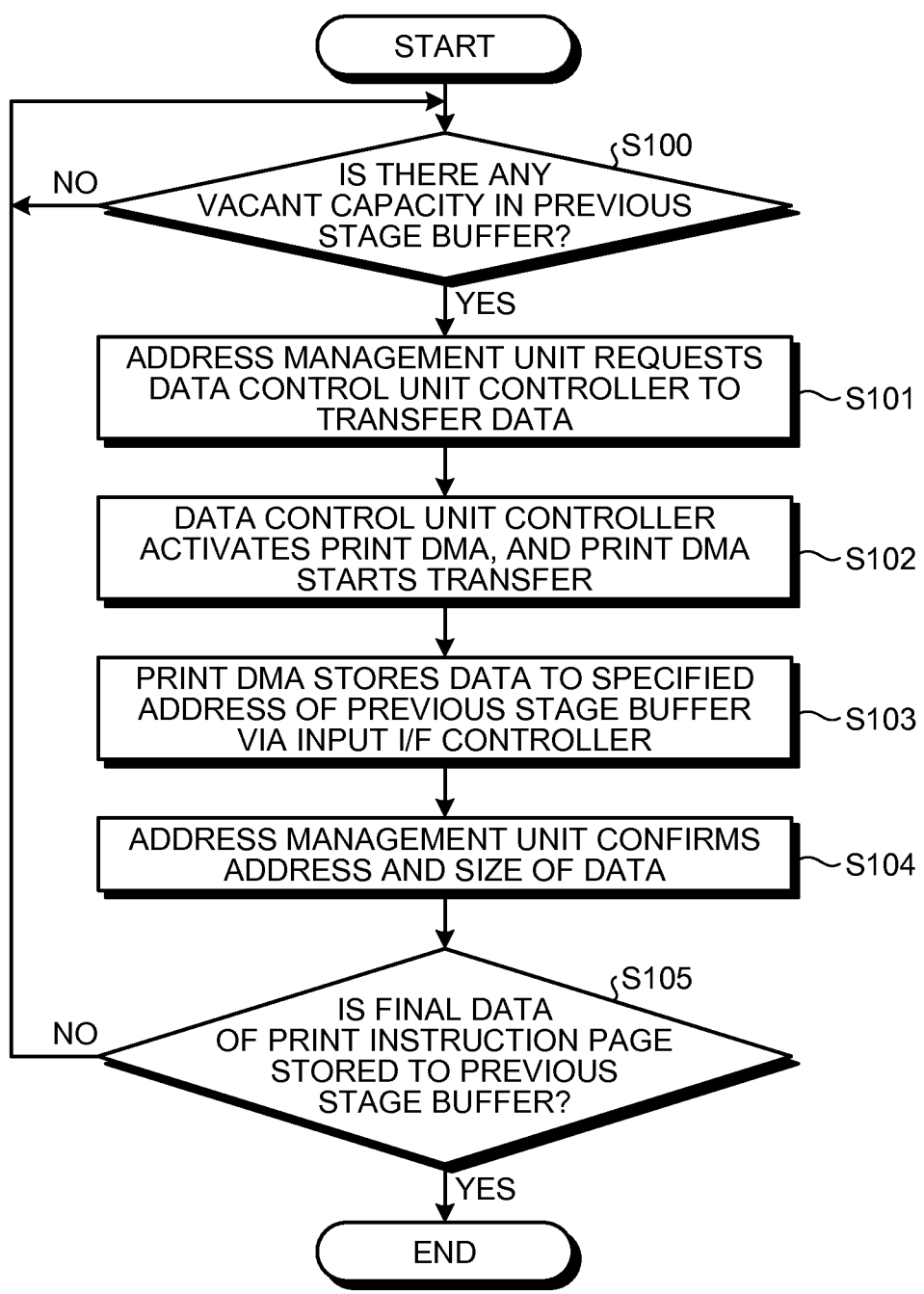
FIG. 14 is a flowchart illustrating processing of an example from print instruction reception to storage of print image data to a previous stage buffer.
Figure 15:
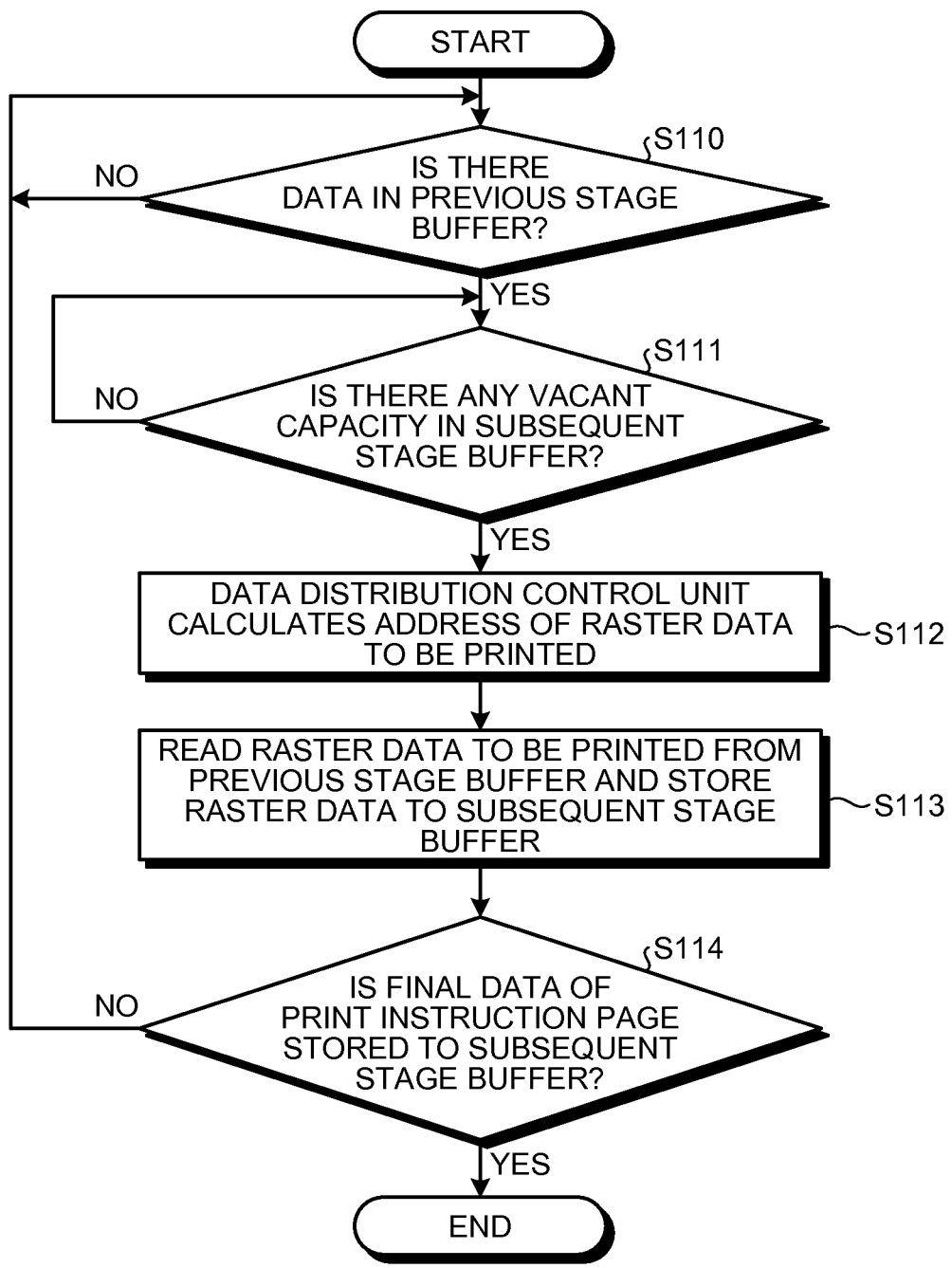
FIG. 15 is a flowchart illustrating processing of an example of data presence/absence confirmation of the previous stage buffer to storage of the print image data to a subsequent stage buffer.

Subsequently, operation of the station 60 will be explained with reference to FIGS. 14 and 15. FIG. 14 illustrates processing of an example from print instruction reception from the print control unit 322 to storage of print image data to the previous stage buffer (buffer 330). FIG. 15 illustrates processing from data presence/absence confirmation of the previous stage buffer to storage of the print image data to the subsequent stage buffer (buffer 332a to 332d).

The processing according to the flowchart of FIGS. 14 and 15 is executed in parallel. The processing according to the flowchart of FIGS. 14 and 15 is executed in parallel, also for multiple, for example, print image data of the colors, i.e., C, M, Y, K. In the explanation below, unless otherwise stated, the printer engine 15 is in the minimum configuration, and the processing of the print image data of the color C is performed.

In FIG. 14, in step S100, the address management unit 333 determines whether there is any vacant capacity for the print image data of the color C in the previous stage buffer (buffer 330). However, when the address management unit 333 determines that there is no vacant capacity, the address management unit 333 waits until vacant capacity becomes available.

On the other hand, when the address management unit 333 determines that there is vacant capacity for the print image data of the color C in the buffer 330, the processing of step S101 is performed, and communication is performed between the address management unit 333 and the data control unit controller 135a of the data control unit 30a via a communication line, not illustrated, and the address management unit 333 requests the data control unit controller 135a to transfer the print image data of the color C. The communication between the address management unit 333 and the data control unit controller 135a of the data control unit 30a may also be performed via the data lines 33a and 35a.

In a subsequent step, i.e., step S102, the data control unit controller 135a activates the print DMA 134a in accordance with the data transfer request from the address management unit 333 in step S101. The print DMA 134a starts the DMA transfer of the print image data of the color C stored in the memory 31a. In a subsequent step, i.e., step S103, the print DMA 134a specifies the address of the previous stage buffer (buffer 330) via the input I/F controller 311a of the image output control unit 50, and stores the print image data of the color C read from the memory 31a to the specified address of the buffer 330.

In a subsequent step, i.e., step S104, the address management unit 333 confirms the address and the size of the print image data of the color C stored in the buffer 330. Then, in a subsequent step, i.e., step S105, the address management unit 333 determines whether the final data of the print instruction page instructed in the print instruction is stored to the previous stage buffer (buffer 330), on the basis of the address and the size of the print image data of the color C. However, when it is determined that the final data are stored, the series of processing in the flowchart of FIG. 14 is terminated. On the other hand, when the final data are determined not to have been stored, the processing of step S100 is performed again.

In FIG. 15, in step S110, the address management unit 333 determines whether the print image data of the color C exist in the previous stage buffer (buffer 330) or not. However, when the address management unit 333 determines that the print image data of the color C do not exist, the address management unit 333 waits until the print image data of the color C is stored to the buffer 330. On the other hand, when the print image data of the color C are determined to be stored to the buffer 330, the processing in step S111 is performed, and the address management unit 333 determines whether there is any vacant capacity in the subsequent stage buffer (buffer 332a). However, when it is determined that there is no vacant capacity, the address management unit 333 waits until vacant capacity becomes available.

On the other hand, when it is determined that there is vacant capacity in the buffer 332a, the processing in step S112 is performed, and the data distribution control unit 331 calculates the address of the print image data of the color C (raster data) which are to be printed. Then, in a subsequent step, i.e., step S113, the data distribution control unit 331 reads the print image data of the color C from the buffer 330 on the basis of the address calculated in step S112, and stores the data to the subsequent stage buffer (buffer 332a).

In a subsequent step, i.e., step S114, the address management unit 333 determines whether the final data of the print instruction page instructed in the print instruction are stored to the subsequent stage buffer (buffer 332a). However, when the final data are determined to be stored, the series of processing of the flowchart of FIG. 15 is finished. On the other hand, when the final data are determined not to have been stored, the processing of step S110 is performed again.

Print Sequence According to First Configuration

Figure 16A:
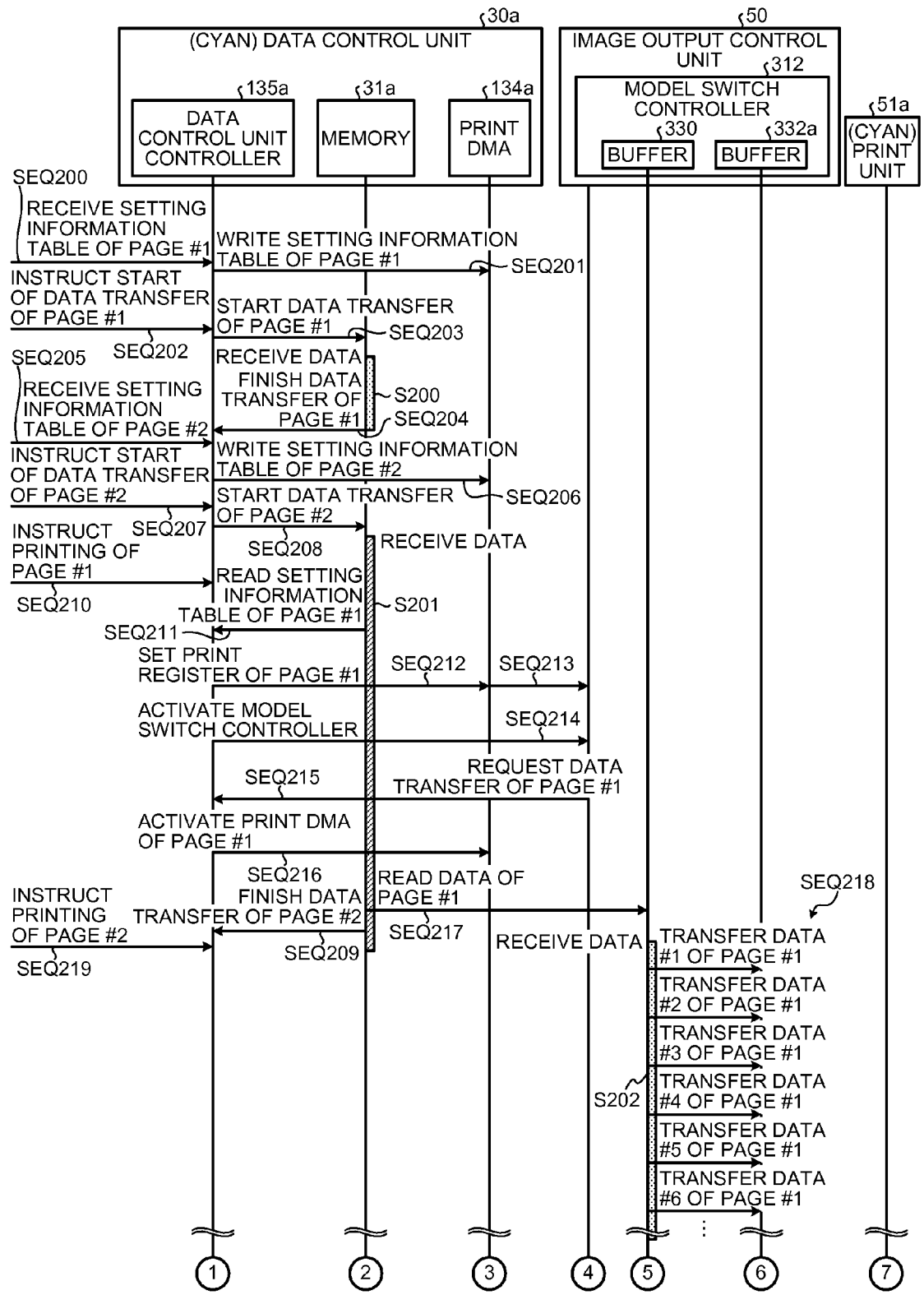

Subsequently, print sequence in the minimum configuration which is the first configuration of the embodiment will be explained in detail. FIG. 16 illustrates a print sequence of an example according to the minimum configuration, while attention is given to the printing of the print image data of the color C. The print sequence of the colors M, Y, K can be executed in parallel with the print sequence of the color C. It should be noted that the print sequence of the colors M, Y, K is substantially the same as the print sequence of the color C, and detailed description thereabout is omitted. In FIG. 16, the same portions as those of FIGS. 9 and 10 are denoted with the same reference numerals, and detailed description thereabout is omitted.

The data control unit controller 135a receives a page #1 setting information table storing setting information about page #1 from the print control unit 322 (SEQ200). The data control unit controller 135a writes the received page #1 setting information table via the memory controller 132a to the memory 31a (SEQ201). When the data control unit controller 135a is instructed to start data transfer of page #1 by the print control unit 322 in SEQ202, the data control unit controller 135a causes the data transfer DMA 133a to prepare writing, to the memory 31a, the print image data of the color C of page #1, transferred from the higher level apparatus 10 via the data line 11a (SEQ203).

In step S200, the data transfer DMA 133a receives the print image data of the color C of page #1 transferred from the higher level apparatus 10, and writes the data to the memory 31a. When the data transfer DMA 133a determines that all the print image data of the color C of page #1 have been received, the data transfer DMA 133a notifies the data control unit controller 135a that the data transfer of page #1 has been finished (SEQ204).

Subsequently, like page #1, the data control unit controller 135a receives a page #2 setting information table from the print control unit 322 (SEQ205). The data control unit controller 135a writes the received page #2 setting information table via the memory controller 132a to the memory 31a (SEQ206). When the data control unit controller 135a is instructed to start the data transfer of page #2 from the print control unit 322 in SEQ207, the data control unit controller 135a causes the data transfer DMA 133a to prepare writing, to the memory 31a, the print image data of the color C of page #2, transferred from the higher level apparatus 10 via the data line 11a (SEQ208).

In step S201, the data transfer DMA 133a receives the print image data of the color C of page #2 transferred from the higher level apparatus 10, and writes the data to the memory 31a. When the data transfer DMA 133a determines that all the print image data of the color C of page #2 have been received, the data transfer DMA 133a reports to the data control unit controller 135a that the data transfer of page #2 has been finished (SEQ209).

For example, in this example, while the print image data of page #2 are written to the memory 31a, the print instruction of page #1 is notified from the print control unit 322 to the data control unit controller 135a (SEQ210). In accordance with the print instruction, the data control unit controller 135a reads the setting information table of page #1 from the memory 31a (SEQ211). This reading of the setting information table from the memory 31a conflicts with writing of the print image data of page #2 to the memory 31a. This conflict can be solved by providing an arbitration circuit in the memory controller 132a.

The data control unit controller 135a sets, in the print DMA 134a and the model switch controller 312, a print register for page #1, on the basis of the setting information table of page #1 read in SEQ211 (SEQ212, SEQ213). After the register is set, the data control unit controller 135a requests the model switch controller 312 to activate (SEQ214). The model switch controller 312 is activated in accordance with this activation request, and requests the data control unit controller 135a to transfer the print image data of the color C of page #1 (SEQ215).

When the data control unit controller 135a receives the data transfer request of SEQ215, the data control unit controller 135a instructs the print DMA 134a to activate, and instructs the DMA transfer of the print image data of the color C of page #1 stored in the memory 31a (SEQ216). In accordance with the instruction, the print DMA 134a reads the print image data of the color C of page #1 from the memory 31a, and transfers the data to the model switch controller 312 (SEQ217), and stores the data to the specified address of the buffer 330 (step S202).

It should be noted that the model switch controller 312 cannot receive all of the print image data of the color C of page #1 stored in the memory 31a with only one reading operation. Accordingly, the print image data are read from the memory 31a in such a manner that, for example, the data are read multiple times so that a predetermined amount of data is read in each time.

Every time, for example, the predetermined amount of the print image data of the color C of page #1 is stored to the buffer 330, the model switch controller 312 reads the print image data from the buffer 330 and transfers the data to the buffer 332a. At this occasion, the print image data are preferably transferred to the buffer 332a in an order of data suitable for high speed printing. This reading of every predetermined amount of print image data from the buffer 330 and the transfer of the read print image data to the buffer 332a are repeated until all the print image data of the color C of page #1 have been transferred (SEQ218). When the transfer of the print image data of the color C of page #1 is finished, the data control unit 30a informs the print control unit 322 to that effect (see FIG. 8, SEQ111a).

After the model switch controller 312 transfers the print image data to the buffer 332a, the model switch controller 312 erases the transferred data of the buffer 330, and successively stores new print image data to a vacant portion. As described above, while the model switch controller 312 reads the print image data of the color C of page #1 from the memory 31a, the data transfer DMA 133a finishes the transfer of the print image data of the color C of page #2, and informs the data control unit controller 135a that the data transfer of page #2 has been finished (SEQ209).

In this example, after the data control unit controller 135a receives the report of the finish of the data transfer of page #2, the data control unit controller 135a receives the print instruction of page #2 from the print control unit 322 (SEQ219). Further, the data control unit controller 135a receives the print head instruction from the print control unit 322 (SEQ220). More specifically, SEQ117 and SEQ118 of FIG. 8 are looked up, and the print control unit 322 receives a printable state report from the conveyance control unit 52, and transmits a print head instruction to the data control unit 30a.

When the data control unit controller 135a receives the print head instruction, the data control unit controller 135a notifies, in accordance with the received print head instruction, the print head instruction to the print DMA 134a and the model switch controller 312 (SEQ221a, SEQ221b).

When the model switch controller 312 receives the print head instruction, and the counter 335 starts counting in accordance with the raster counter (step S203). The model switch controller 312 is configured such that the timing of transfer of print image data to the print unit 51a is determined in advance in accordance with the model information recognized on the basis of the image output control setting information table. When the counted value by the counter 335 becomes the same as the transfer timing, the model switch controller 312 starts reading the print image data of the color C from the buffer 332a, and transfers the data to the print unit 51a (SEQ222). With the transfer of the print image data, the print unit 51a starts printing.

This reading of the print image data of the color C from the buffer 332a and the transfer of the read data to the print unit 51a are performed for, e.g., every predetermined amount of print image data, and are repeated until all the transfer of the print image data of the color C of page #1 stored in the buffer 332a is finished.

When all the transfer of the print image data of page #1 to the print unit 51a is finished, the model switch controller 312 informs the print DMA 134a of the finish of the printing of page #1 (SEQ223). In this case, the model switch controller 312 informs the print DMA 134a of the finish of the printing of page #1, when all the transfer of the print image data of the colors, i.e., C, M, Y, K of page #1 to the print units 51a, 51b, 51c, and 51d has been finished. The print DMA 134a having received the print end report of page #1 informs the data control unit controller 135a that the DMA transfer of the print image data of page #1 has been finished (SEQ224).

In this example, the data control unit controller 135a already received the print instruction of page #2 in SEQ219 explained above. Accordingly, when the data control unit controller 135a receives, from the print DMA 134a, the report indicating that the DMA transfer of the print image data of page #1 has been finished, the data control unit controller 135a executes print processing of page #2 in accordance with the print instruction of page #2 already received, like the print instruction reception of page #1.

More specifically, the data control unit controller 135a reads the setting information table of page #2 from the memory 31a (SEQ225), and sets, in the print DMA 134a and the model switch controller 312, a print register for page #2, on the basis of the setting information table of page #2 read in SEQ225 (SEQ226, SEQ227). When the print register of page #2 is set, the model switch controller 312 requests the data control unit controller 135a to transfer the print image data of the color C of page #2 (SEQ228).

The data control unit controller 135a instructs the print DMA 134a to activate in accordance with the data transfer request of SEQ228, and instructs the DMA transfer of the print image data of the color C of page #2 stored in the memory 31a (SEQ229). The print DMA 134a reads the print image data of the color C of page # from the memory 31a in accordance with the instruction, and transfers the data to the model switch controller 312 (SEQ230), and stores the data to the specified address of the buffer 330.

When the predetermined amount of the print image data of the color C of page #2 is stored to the buffer 330, the model switch controller 312 reads the print image data from the buffer 330 and transfers the data to the buffer 332a. This reading of every predetermined amount of print image data from the buffer 330 and the transfer of the read print image data to the buffer 332a are repeated until all the print image data of the color C of page #2 have been transferred (SEQ231). When the transfer of the print image data of the color C of page #2 is finished, the data control unit 30a informs the print control unit 322 to that effect (see FIG. 8, SEQ115).

After the raster counter is counted for a page length of page #1 by the counter 335, the model switch controller 312 resets the counted value to "0", and resumes counting (step S204). When the transfer timing determined in advance in accordance with the model information recognized on the basis of the image output control setting information table becomes the same as the counted value by the counter 335, the model switch controller 312 starts reading the print image data of the color C from the buffer 332a, and transfers every predetermined amount of data thus read to the print unit 51a (SEQ232). With the transfer of the print image data, the print unit 51a starts printing.

When all the transfer of the print image data of the colors, i.e., C, M, Y, K of page #1 to the print units 51a, 51b, 51c and 51d has been finished, the model switch controller 312 informs the print DMA 134a of the finish of the printing of page #1 (SEQ233). The print DMA 134a having received the print end report of page #1 informs the data control unit controller 135a that the DMA transfer of the print image data of page #1 has been finished (SEQ234).

Second Configuration According to Embodiment

Figure 17:
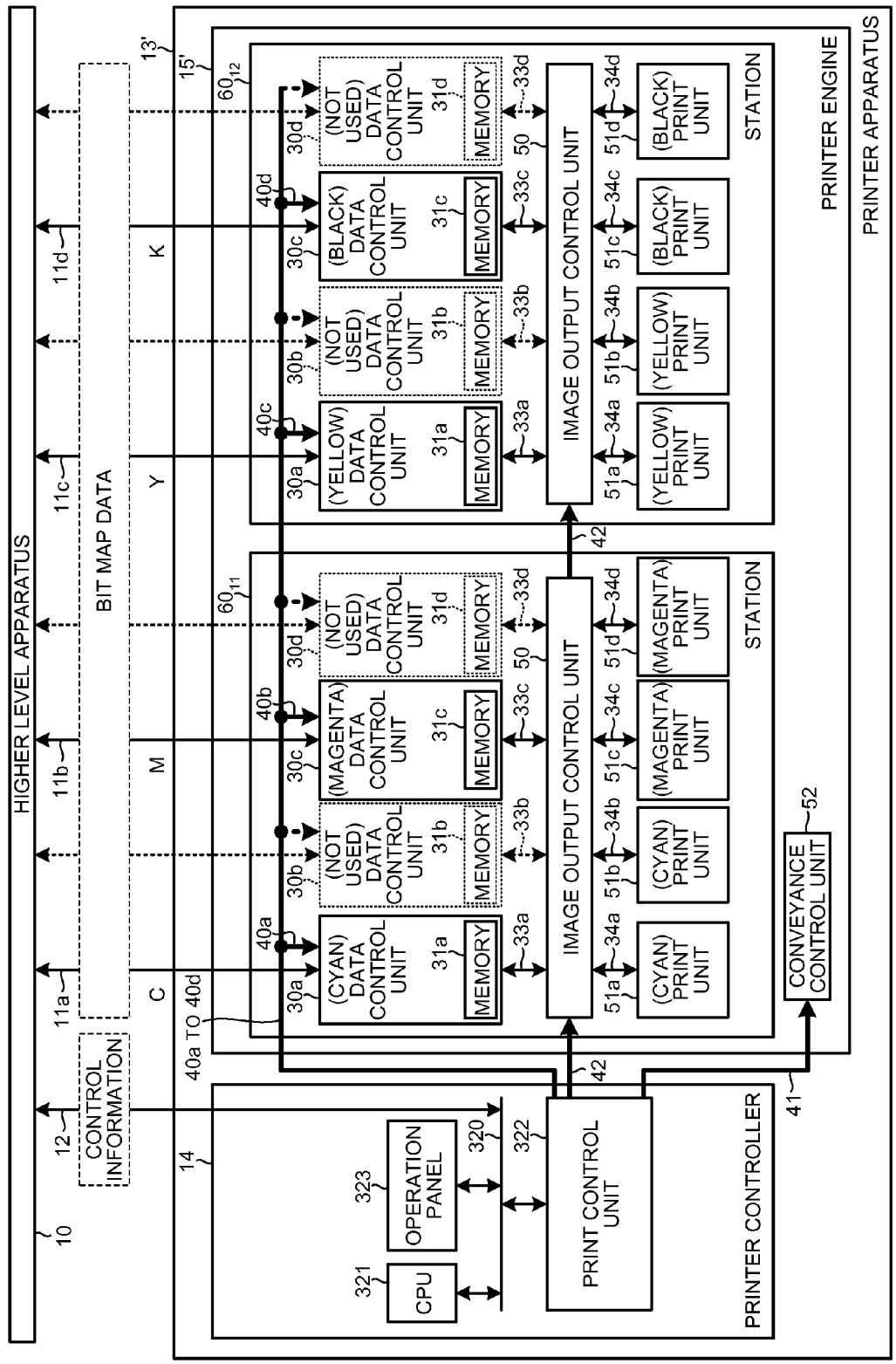
FIG. 17 is a block diagram illustrating a configuration of an example of a printer apparatus having a printer engine of a middle configuration.

Subsequently, a middle configuration model which is the second configuration of the embodiment will be explained. FIG. 17 illustrates a configuration of an example of a printer apparatus 13' having a printer engine 15' of the middle configuration. In FIG. 17, the same portions as those of FIG. 3 are denoted with the same reference numerals, and detailed description thereabout is omitted.

As illustrated in FIG. 17, the printer engine 15' of the middle configuration includes stations $60_{11}$ and $60_{12}$ having the same configuration. These stations $60_{11}$ and $60_{12}$ have the same configuration as the station 60 of the printer engine 15 of the minimum configuration explained above. Each of them includes the data control units 30a, 30b, 30c and 30d, the image output control unit 50, and the print units 51a, 51b, 51c and 51d.

The engine I/F control lines 40a, 40b, 40c and 40d from the print control unit 322 are connected to the data control units 30a, 30b, 30c and 30d of each of the stations $60_{11}$ and $60_{12}$. Likewise, the model switch control line 42 from the print control unit 322 is connected to the image output control unit 50 of each of the stations $60_{11}$ and $60_{12}$.

In the example of FIG. 17, the station $60_{11}$ of the stations $60_{11}$ and $60_{12}$ provided in the printer engine 15' of the middle configuration prints in the color C and the color M, and the station $60_{12}$ thereof prints in the color Y and the color K.

More specifically, in the station $60_{11}$, the print units 51a and 51b of the print units 51a, 51b, 51c and 51d print in the color C, and the print unit 51c and print unit 51d thereof prints in the color M. In this example, the data control unit 30a of the data control units 30a, 30b, 30c and 30d provided in the station $60_{11}$ handles the print image data of the color C, and the data control unit $30c$ thereof handles the print image data of the color M. More specifically, in the station $60_{11}$, the data line $11a$ transferring the print image data of the color C from the higher level apparatus 10 is connected to the data control unit $30a$, and the data line $11b$ transferring the print image data in the color M is connected to the data control unit $30c$. The data control units $30b$ and $30d$ are not used.

Likewise, in the station $60_{12}$, the print units $51a$ and $51b$ of the print units $51a$, $51b$, $51c$ and $51d$ prints in the color Y, and the print unit $51c$ and print unit $51d$ thereof prints in the color K. In this example, the data control unit $30a$ of the data control units $30a$, $30b$, $30c$ and $30d$ provided in the station $60_{12}$ handles the print image data of the color Y, and the data control unit $30c$ thereof handles the print image data of the color K. The data control units $30b$ and $30d$ are not used. More specifically, in the station $60_{12}$, the data line $11c$ transferring the print image data of the color Y from the higher level apparatus 10 is connected to the data control unit $30a$, and the data line $11d$ transferring the print image data in the color K is connected to the data control unit $30c$.

As described above, the total number of print units $51a$ to $51d$ provided in each of the stations $60_{11}$ and $60_{12}$ is more than the number of colors used for printing, the print image data of the same color may be printed by multiple print units.

FIG. 18 illustrates an example of a data control setting information table in the middle configuration model. The items of the data control setting information table is the same as those in the data control setting information table of the minimum configuration model as explained with reference to FIG. 11.

In the common items, the number of stations is "2", and the station position number is "1" or "2". The number of data control units per station is "2". Therefore, as illustrated in FIG. 17, each of the stations $60_{11}$ and $60_{12}$ uses only two data control units $30a$ and $30c$.

On the other hand, in the data control unit-dependent items, a number of a data control unit and a color handled by the data control unit corresponding to the number are associated with each other. Like the minimum configuration explained above, the numbers of the data control units are allocated in order such that, for example, a smaller number is allocated to a data control unit arranged at a position closer to the printer controller 14 and used in the configuration.

In the example of FIG. 18, the data control unit of the number "1" arranged at the position closest to the printer controller 14 is defined as handling the color C. Hereinafter, the data control unit of the number "2" is defined as handling the color M, the data control unit of the number "3" is defined as handling the color Y, and the data control unit of the number "4" is defined as handling the color K, which are arranged away from the printer controller 14 in this order.

In the example of FIG. 18, the number of data control units per station is "2" from the value of the item of the number of stations in the common item, and accordingly, for example, the station of the position number "1" of the data control units as indicated by the numbers "1" to "4" is defined as having the data control units of the numbers "1" and "2", and the station of the position number "2" thereof is defined as having the data control units of the numbers "3" and "4".

More specifically, the data control units of the numbers "1" and "2" are the data control units $30a$ and $30c$, respectively, of the station $60_{11}$, and are configured to handle print image data in color C and color M, respectively. More specifically, the data control units of the numbers "3" and "4" are the data control units $30a$ and $30c$, respectively, of the station $60_{12}$, and are configured to handle print image data in color Y and color K, respectively.

FIG. 19 illustrates examples of an image output control setting information table in the middle configuration model. The items of the image output control setting information table are the same as those in the image output control setting information table in the minimum configuration model as explained with reference to FIG. 12.

Illustrated in (a) of FIG. 19 is an example of an image output control setting information table corresponding to the station of which station position number is "1". In the common items, the number of use of the input I/F controller is "2", and the station position is "1". On the other hand, in the image output control unit-dependent items, the color C is allocated to the print units #1 and #2, and the color M is allocated to the print units #3 and #4. More specifically, in the station $60_{11}$ of the position number "1", it is defined that the color C is allocated to the print units $51a$ and $51b$, and the color M is allocated to the print units $51c$ and $51d$.

Illustrated in (b) of FIG. 19 is an example of an image output control setting information table corresponding to the station of which station position number is "2". In the common items, the number of use of the input I/F controller is "2", and the station position is "2". On the other hand, in the image output control unit-dependent items, the color Y is allocated to the print units #1 and #2, and the color K is allocated to the print units #3 and #4. More specifically, in the station $60_{12}$ of the position number "2", it is defined that the color Y is allocated to the print units $51a$ and $51b$, and the color K is allocated to the print units $51c$ and $51d$.

The image output setting information table and the data control setting information table generated by the CPU 321 are provided to the print control unit 322. For example, when the printer apparatus 13 is activated, the print control unit 322 transmits the image output setting information table via the model switch control line 42 to the image output control unit 50 of each of the stations $60_{11}$ and $60_{12}$ via the model switch control line 42. The image output control setting information table received by the image output control unit 50 of each of the stations $60_{11}$ and $60_{12}$ is provided to the model switch controller 312. In the model switch controller 312, the model information is set in the model switch unit 334 on the basis of the image output control setting information table. On the basis of the model information, the model switch controller 312 selects a path of print image data of each color.

In addition, the print control unit 322 transmits the data control setting information table via the engine I/F control lines $40a$ to $40d$ to the data control units $30a$ to $30d$, respectively, of each of the stations $60_{11}$ and $60_{12}$. The data control units $30a$, $30b$, $30c$ and $30d$ of each of the stations $60_{11}$ and $60_{12}$ determines whether to be used or not on the basis of the data control setting information table received, and when the data control units $30a$, $30b$, $30c$ and $30d$ are determined to be used, the data control units $30a$, $30b$, $30c$ and $30d$ determines which color of print image data is to be used.

The configuration of the data control units $30a$, $30b$, $30c$ and $30d$ of each of the stations $60_{11}$ and $60_{12}$, e.g., whether the data control units $30a$, $30b$, $30c$ and $30d$ are to be used or not and the color of the print image data to be used are determined in advance in accordance with the position number of the station and the number of data control units per station stored in the data control setting information table. However this is not limited to this example. The configuration of each of the data control units $30a$ to $30d$ may be defined in accordance with the data control setting information table.

Figure 20:
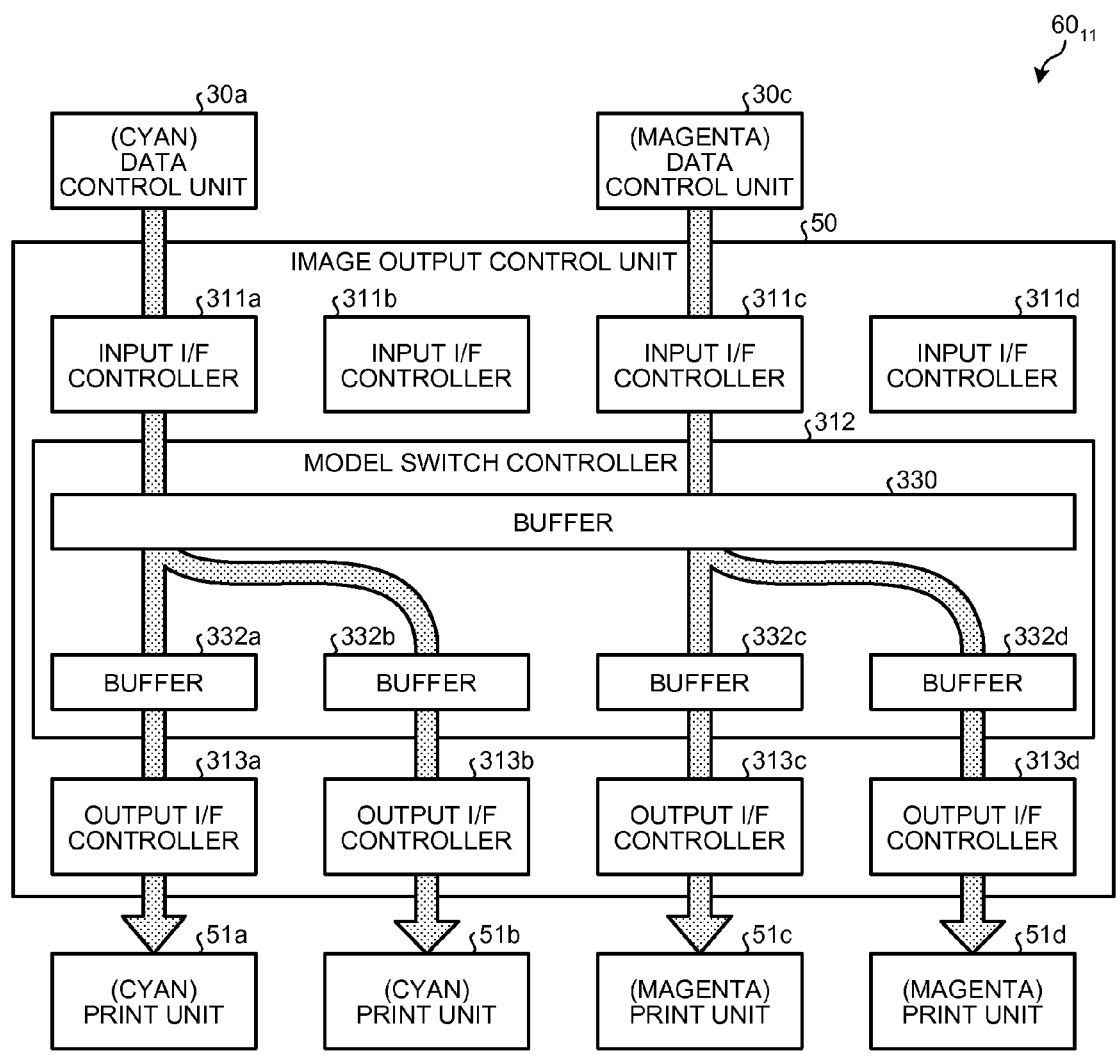
FIG. 20 is a schematic diagram schematically illustrating a flow of print image data from each data control unit to the print unit according to the middle configuration model.

FIG. 20 schematically illustrates a flow of print image data from the data control units $30a$ to $30d$ to the print units $51a$ to $51d$ in the station $60_{11}$ in the middle configuration model as illustrated in FIG. 17. In FIG. 20, the same portions as those of FIGS. 10 and 17 are denoted with the same reference numerals, and detailed description thereabout is omitted.

In the middle configuration model, the printer engine 15' includes the two stations $60_{11}$ and $60_{12}$ as described above, and the station $60_{11}$ prints the print sheet 201 using the print units 51a, 51b, 51c and 51d provided in the station $60_{11}$, on the basis of the print image data of the colors C and M transferred from the higher level apparatus 10. On the other hand, the station $60_{12}$ prints the print sheet 201 using the print units 51a, 51b, 51c and 51d provided in the station $60_{12}$, on the basis of the print image data of the colors Y and K transferred from the higher level apparatus.

The stations $60_{11}$ and $60_{12}$ perform the same processing except that they use different colors, and therefore, the station $60_{11}$ will be explained as an example.

The print image data of the colors C and M are transferred to the data control units 30a and 30c from the higher level apparatus 10, and are input via the data lines 35a and 35c to the input I/F controllers 311a and 311c. The print image data of the colors C and M which are input into the input I/F controllers 311a and 311c are stored to the buffer 330 in the model switch controller 312.

In this case, the model switch controller 312 can recognize that the printing of the print image data of the color C is performed with the two print units 51a and 51b, and the printing of the print image data of the color M is performed with the two print units 51c and 51d, on the basis of the model information set in the model switch unit 334. Therefore, the model switch unit 334 controls the data distribution control unit 331 to store the print image data of the color C read from the buffer 330 into the buffers 332a and 332b. Likewise, the model switch unit 334 controls the data distribution control unit 331 to store the print image data of the color M read from the buffer 330 into the buffers 332c and 332d. At this occasion, the print image data of the colors C and M are preferably sorted in an order suitable for high speed printing and stored to the buffers 332a and 332b, and, the buffers 332c and 332d, respectively.

The model switch controller 312 measures print timing on the basis of the counted value of the counter 335 started upon the print head instruction transmitted in synchronization with the sheet conveyance from the print control unit 322, and when the print timing is attained, the print image data of the color C is read from the buffers 332a and 332b. The print image data of the color C thus read are input into the output I/F controllers 313a and 313b, and are provided via the data lines 36a and 36b to the print units 51a and 51b.

Likewise, the model switch controller 312 reads the print image data of the color M from the buffers 332c and 332d with print timing. The print image data of the color M thus read are input into the output I/F controllers 313c and 313d, and are provided via the data lines 36c and 36d to the print units 51c and 51d, and printing is performed.

As described above, according to the middle configuration, the colors, i.e., C, M, Y, K are printed using the two print units, and therefore, this can achieve higher speed printing process than the minimum configuration explained above.

Print Sequence According to Second Configuration

Figure 21B:
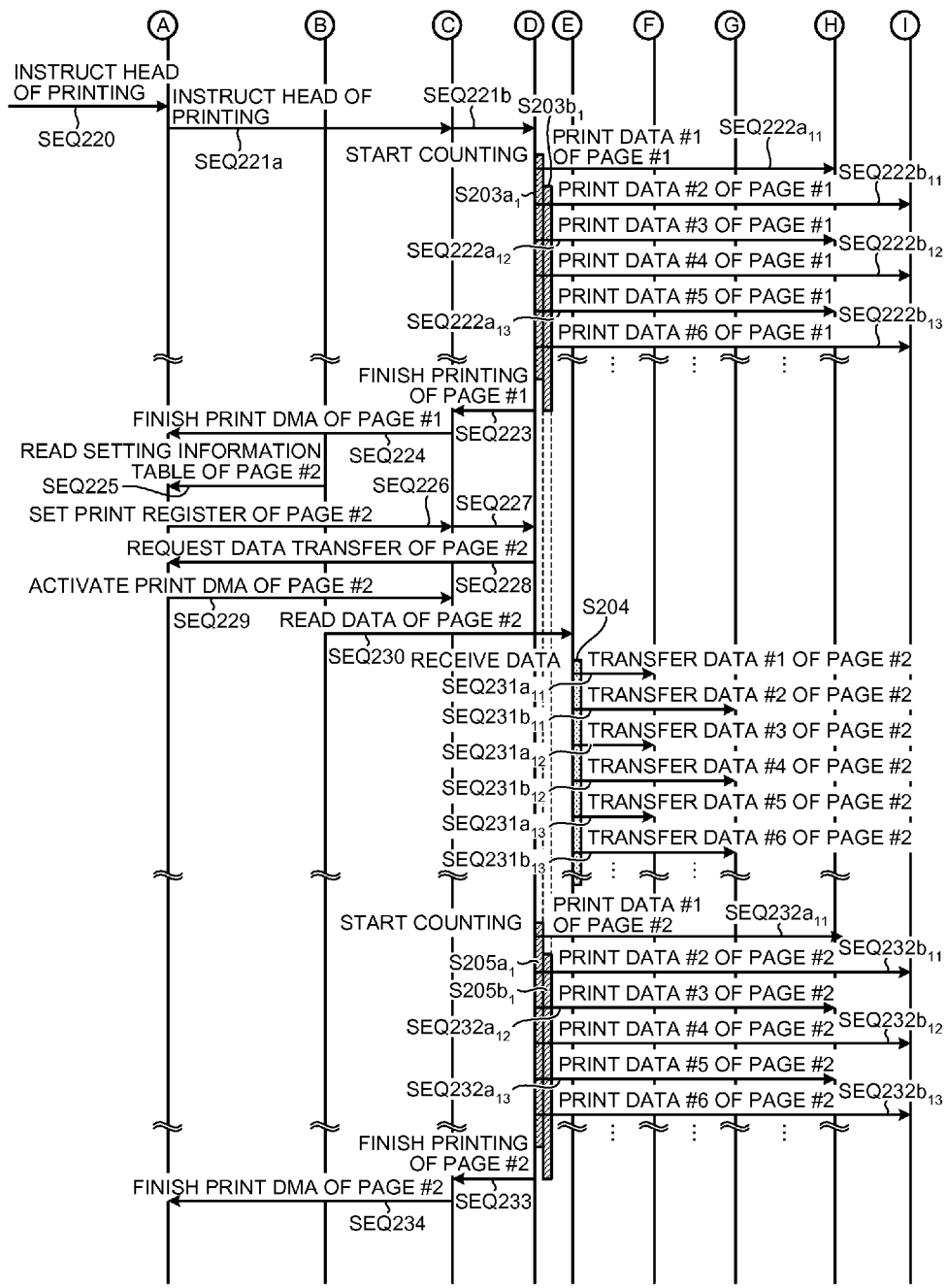
FIG. 21B is a sequence diagram illustrating a print sequence of an example according to the middle configuration.

Subsequently, print sequence in the middle configuration which is the second configuration of the embodiment will be explained in detail. FIGS. 21A and 21B illustrate a print sequence of an example according to the middle configuration, while attention is given to the printing of the print image data of the color C. More specifically, an image output control unit 50 and print units 51a and 51b as illustrated in FIGS. 21A and 21B are configured to be included in the station $60_{11}$. It should be noted that the print sequence of the colors M, Y, K is substantially the same as the print sequence of the color C, and description thereabout is omitted. The print sequence of the colors M, Y, K is executed in parallel with the print sequence of the color C.

It should be noted that FIGS. 21A and 21B are obtained by dividing a series of sequence diagram, and flows of corresponding processing in FIGS. 21A and 21B are denoted with the same symbols (A to I). In FIGS. 21A and 21B, the same portions as those of FIGS. 9, 10, and 17 and the same portions as those in the sequence diagram of FIG. 16 are denoted with the same reference numerals, and detailed description thereabout is omitted. Likewise, in FIGS. 21A and 21B, the same portions as those in the sequence diagram of FIG. 16 are denoted with subscripts and the like.

In the sequence of FIGS. 21A and 21B, processing from SEQ200 at which the setting information table of page #1 is received by the data control unit 30a to SEQ217 at which the image output control unit 50 starts reading the print image data of page #1 stored in the memory 31a is the same as the processing as illustrated in FIG. 16, and explanation thereabout is omitted.

In SEQ217, the print DMA 134a reads the print image data of the color C of page #1 from the memory 31a, and transfers the data to the model switch controller 312, and stores the data to the specified address of the buffer 330. This print image data of the color C stored in the buffer 330 is read from the buffer 330 in accordance with the control of the data distribution control unit 331, and are repeatedly transferred to the buffers 332a and 332b corresponding to the print units 51a and 51b, respectively. (SEQ$218a_{11}$, SEQ$218a_{12}$, . . . , and, SEQ$218b_{11}$, SEQ$218b_{12}$, . . . ).

At this occasion, the model switch controller 312 sorts, an in appropriate order, the print image data read from the buffer 330 and transfers the print image data to the buffers 332a and 332b, in order to print the print image data of the color C using the print units 51a and 51b.

Figure 22:
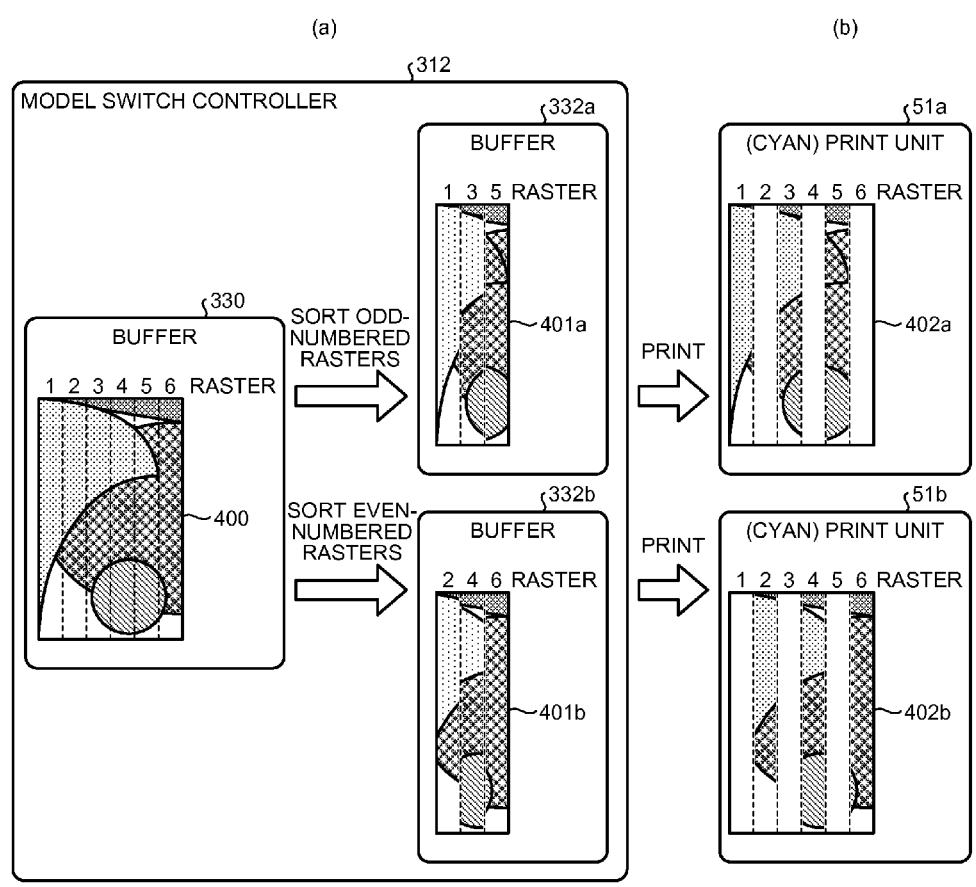
FIG. 22 illustrates an example of sorting of print image data.

FIG. 22 schematically illustrates an example of sorting of print image data by the model switch controller 312. In the present embodiment, the print image data stored in the buffer 330 are read on a raster basis (in units of lines) in such a manner that each of the odd-numbered rasters and the even-numbered rasters are alternately read, and are transferred to the buffers 332a and 332b.

More specifically, as illustrated in (a) of FIG. 22, the buffer 330 stores print image data 400 on a raster basis. The addresses of the print image data 400 in the buffer 330 are managed by the address management unit 333. In the model switch controller 312, the data distribution control unit 331 selects and reads, in accordance with the address information managed by the address management unit 333, odd-numbered raster data (raster data #1, raster data #3, . . . ) from the print image data 400 including the raster data #1, raster data #2, . . . stored in the buffer 330 from the buffer 330, and stores the data on a raster basis in the buffer 332a (print image data 401a).

Likewise, in the model switch controller 312, the data distribution control unit 331 selects, in accordance with the address information managed by the address management unit 333, even-numbered raster data (raster data #2, raster data #4, . . . ) of the print image data 400 from the buffer 330, and stores the data on a raster basis in the buffer 332b (print image data 401b).

The addresses of the print image data 401a and 401b stored in the buffers 332a and 332b are managed by the address management unit 333.

When the data control unit 30a finishes the transfer of the print image data of the color C of page #1 to the buffers 332a and 332b for the print units 51a and 51b, the data control unit 30a informs the print control unit 322 to that effect (see FIG. 8, SEQ111a).

Likewise, although not illustrated, in the station $60_{11}$, when the transfer of the print image data of the color M of page #1 to the buffers 332c and 332d for the print units 51c and 51d is finished, the data control unit 30b informs the print control unit 322 to that effect. Likewise, in the station $60_{12}$, when the transfer of the print image data of the color Y to the buffers 332a and 332b and the transfer of the print image data of the color K to the buffers 332c and 332d are finished, the data control units 30a and 30c informs the print control unit 322 to that effect.

When the print control unit 322 receives the report indicating the finish of the transfer from the stations $60_{11}$ and $60_{12}$, the print control unit 322 transmits the print head instruction to the stations $60_{11}$ and $60_{12}$.

In the example of FIGS. 21A and 21B, the data control unit controller 135a receives the print instruction of page #2 from the print control unit 322 after receiving the data transfer finish report of page #2 (SEQ219). When the data control unit controller 135a receives the print head instruction from the print control unit 322 in SEQ220, the data control unit controller 135a notifies, in accordance with the received print head instruction, the print head instruction to the print DMA 134a and the model switch controller 312 (SEQ221a, SEQ221b).

When the model switch controller 312 receives the print head instruction, the counter 335 starts counting in accordance with the raster counter. In the example of the middle configuration, the print image data of the color C are stored in the buffer memories 332a and 332b for the odd-numbered and even-numbered raster data, respectively. Accordingly, the counter 335 counts in each of the buffer memories 332a and 332b (step $S203a_1$ and step $S203b_1$).

In the example of FIGS. 21A and 21B, the timing with which the counter 335 starts counting in the buffer memories 332a and 332b is different as in, e.g., step $S203a_1$ and step $S203b_1$. This is because the print positions of the print units 51a and 51b for the buffer memories 332a and 332b are different in the conveyance direction of the print sheet 201.

In the model switch controller 312, the timing with which the print image data are transferred to the print units 51a and 51b is determined in advance in accordance with the model information recognized on the basis of the image output control setting information table. When the counted value corresponding to the buffer memory 332a counted by the counter 335 becomes the same as the transfer timing at which the data are transferred to the print unit 51a, the model switch controller 312 reads the print image data 401a from the buffer 332a, and transfers the data to the print unit 51a (SEQ$222a_{11}$, SEQ$222a_{12}$, ... ). With the transfer of the print image data 401a, the print unit 51a starts printing.

Likewise, every time the counted value corresponding to the buffer memory 332b counted by the counter 335 becomes the same as the transfer timing at which the data are transferred to the print unit 51b, the model switch controller 312 reads the print image data 401b from the buffer 332b, and transfers the data to the print unit 51b (SEQ$222b_{11}$, SEQ$222b_{12}$, ... ). With the transfer of the print image data 401a, the print unit 51b starts printing.

More specifically, as illustrated in FIG. 22(b) as the print image data 402a and 402b, the odd-numbered raster data stored in the buffer 332a and the even-numbered raster data stored in the buffer 332b are read with alternate timing on a raster basis, and are transferred to the print units 51a and 51b. As explained with reference to FIG. 4, the print units 51a and 51b are configured to print in units of lines (on a raster basis) with nozzle rows 511 of the nozzle blocks 510.

Accordingly, as illustrated in (b) of FIG. 22, the odd-numbered raster data stored in the buffer 332a and the even-numbered raster data stored in the buffer 332b are transferred to the print units 51a and 51b alternately with different timing in units of lines. Accordingly, a print result in which the raster data #1, #2, . . . are arranged in units of lines, as illustrated in the print image data 400 in (a) of FIG. 22, can be obtained.

For example, the reading of the print image data of the color C from the buffer 332a and the transfer of the read data to the print unit 51a are performed with, for example, a predetermined amount of print image data, and are repeated until all the print image data of the color C of page #1 stored in the buffer 332a have been transferred.

When all the print image data of page #1 have been transferred to the print units 51a and 51b, the model switch controller 312 informs the print DMA 134a that the printing of page #1 is finished (SEQ223). In this case, in the station $60_{11}$, when the model switch controller 312 finishes, for the print image data of page #1, all of the transfer of the data in the color C to the print units 51a and 51b of the station $60_{11}$ and the transfer of the image data in the color M to the print units 51c and 51d, the model switch controller 312 informs the print DMA 134a of the station $60_{11}$ that the printing of page #1 is finished.

In the station $60_{11}$, the print DMA 134a having received the print end report of page #1 informs the data control unit controller 135a that the DMA transfer of the print image data of page #1 has been finished (SEQ224). The DMA transfer finish report of the print image data of page #1 is transmitted from the data control unit controller 135a to the print control unit 322.

The station $60_{12}$ performs the same processing as SEQ220 to SEQ224 explained above on the print image data of the colors Y and K. Explanation about the processing on the print image data of the colors Y and K is omitted in order to avoid complexity.

In this example, the data control unit controller 135a already received the print instruction of page #2 in SEQ219 explained above. Accordingly, when the data control unit controller 135a receives, from the print DMA 134a, the report indicating that the DMA transfer of the print image data of page #1 has been finished, the data control unit controller 135a executes print processing of page #2 in accordance with the print instruction of page #2 already received, like the print instruction reception of page #1.

More specifically, the data control unit controller 135a reads the setting information table of page #2 from the memory 31a (SEQ225), and sets, in the print DMA 134a and the model switch controller 312, a print register for page #2, on the basis of the setting information table of page #2 read in SEQ225 (SEQ226, SEQ227). When the print register of page #2 is set, the model switch controller 312 requests the data control unit controller 135a to transfer the print image data of the color C of page #2 (SEQ228).

The data control unit controller 135a instructs the print DMA 134a to activate in accordance with the data transfer request of SEQ228, and instructs the DMA transfer of the print image data of the color C of page #2 stored in the memory 31a (SEQ229). The print DMA 134a reads the print image data of the color C of page # from the memory 31a in accordance with the instruction, and transfers the data to the model switch controller 312 (SEQ230), and stores the data to the specified address of the buffer 330.

The predetermined amount of print image data of the color C of page #2 stored in the buffer 330 is read from the buffer 330 in accordance with the control of the data distribution control unit 331, and are repeatedly transferred to the buffers 332a and 332b corresponding to the print units 51a and 51b, respectively. (SEQ231$a_{11}$, SEQ231$a_{12}$, ..., and, SEQ231$b_{11}$, SEQ231$b_{12}$, ...). At this occasion, the model switch controller 312 sorts, an inappropriate order, the print image data read from the buffer 330 and transfers the print image data to the buffers 332a and 332b, as explained with reference to FIG. 20, in order to print the print image data of the color C using the print units 51a and 51b.

When the data control unit 30a finishes the transfer of the print image data of the color C of page #2 to the buffers 332a and 332b for the print units 51a and 51b, the data control unit 30a informs the print control unit 322 to that effect (see FIG. 8, SEQ115).

The following data transfers are also performed in the same manner: the transfer in which the data control unit 30b of the station $60_{11}$ transfers the print image data of the color M of page #1 to the buffers 332c and 332d for the print units 51c and 51d, the transfer in which the data control units 30a and 30c of the station $60_{12}$ transfer the print image data of the colors Y and K to the buffers 332a and 332b, and, the buffers 332c and 332d, and when the data transfer is finished, the print control unit 322 is informed to that effect.

After the raster counter is counted for a page length of page #1 by the counter 335, the model switch controller 312 resets the counted value to "0", and resumes counting in the buffer memories 332a and 332b (step S205$a_1$, step S205$b_1$).

When the counted value corresponding to the buffer memory 332a counted by the counter 335 becomes the same as the transfer timing at which the data are transferred to the print unit 51a, the model switch controller 312 reads the print image data 401a from the buffer 332a, and transfers the data to the print unit 51a (SEQ232$a_{11}$, 232$a_{12}$, ...). With the transfer of the print image data 401a, the print unit 51a executes printing.

Likewise, every time the counted value corresponding to the buffer memory 332b counted by the counter 335 becomes the same as the transfer timing at which the data are transferred to the print unit 51b, the model switch controller 312 reads the print image data 401b from the buffer 332b, and transfers the data to the print unit 51b (SEQ232$b_{11}$, SEQ232$b_{12}$, ...). With the transfer of the print image data 401a, the print unit 51b starts printing.

When all the print image data of the color C of page #1 have been transferred to the print units 51a and 51b, the model switch controller 312 informs the print DMA 134a that the printing of page #2 is finished (SEQ233). In this case, in the station $60_{11}$, when the model switch controller 312 finishes, for the print image data of page #2, all of the transfer of the data in the color C to the print units 51a and 51b of the station $60_{11}$ and the transfer of the image data in the color M to the print units 51c and 51d, the model switch controller 312 informs the print DMA 134a of the station $60_{11}$ that the printing of page #2 is finished.

In the station $60_{11}$, the print DMA 134a having received the print end report of page #2 informs the data control unit controller 135a that the DMA transfer of the print image data of page #2 has been finished (SEQ234). The DMA transfer finish report of the print image data of page #2 is transmitted from the data control unit controller 135a to the print control unit 322 (see SEQ122a and SEQ122b of FIG. 8).

Like the above colors C and M, the station $60_{12}$ performs the print processing of the color Y and the color K. Explanation about the processing on the print image data of the colors Y and K is omitted in order to avoid complexity. In the station $60_{12}$, the print DMA 134a having received the print end report of page #2 informs the data control unit controller 135a that the DMA transfer of the print image data of page #2 has been finished. The DMA transfer finish report of the print image data of page #2 is transmitted from the data control unit controller 135a of the station $60_{12}$ to the print control unit 322 (see SEQ122c and SEQ122d of FIG. 8).

Third Configuration According to Embodiment

Figure 23A:
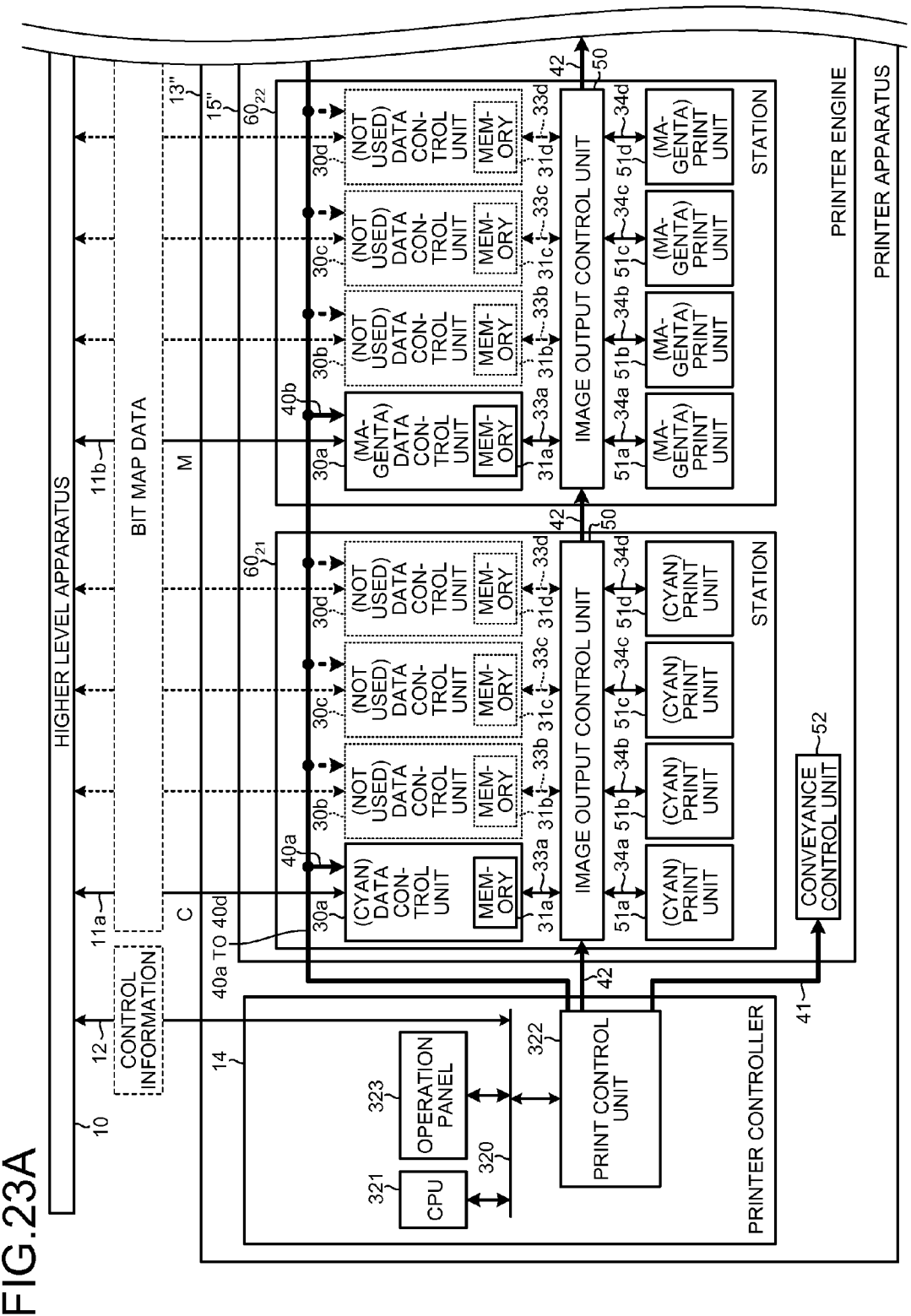
FIG. 23A is a block diagram illustrating a configuration of an example of a printer apparatus having a printer engine of a maximum configuration model.
Figure 23B:
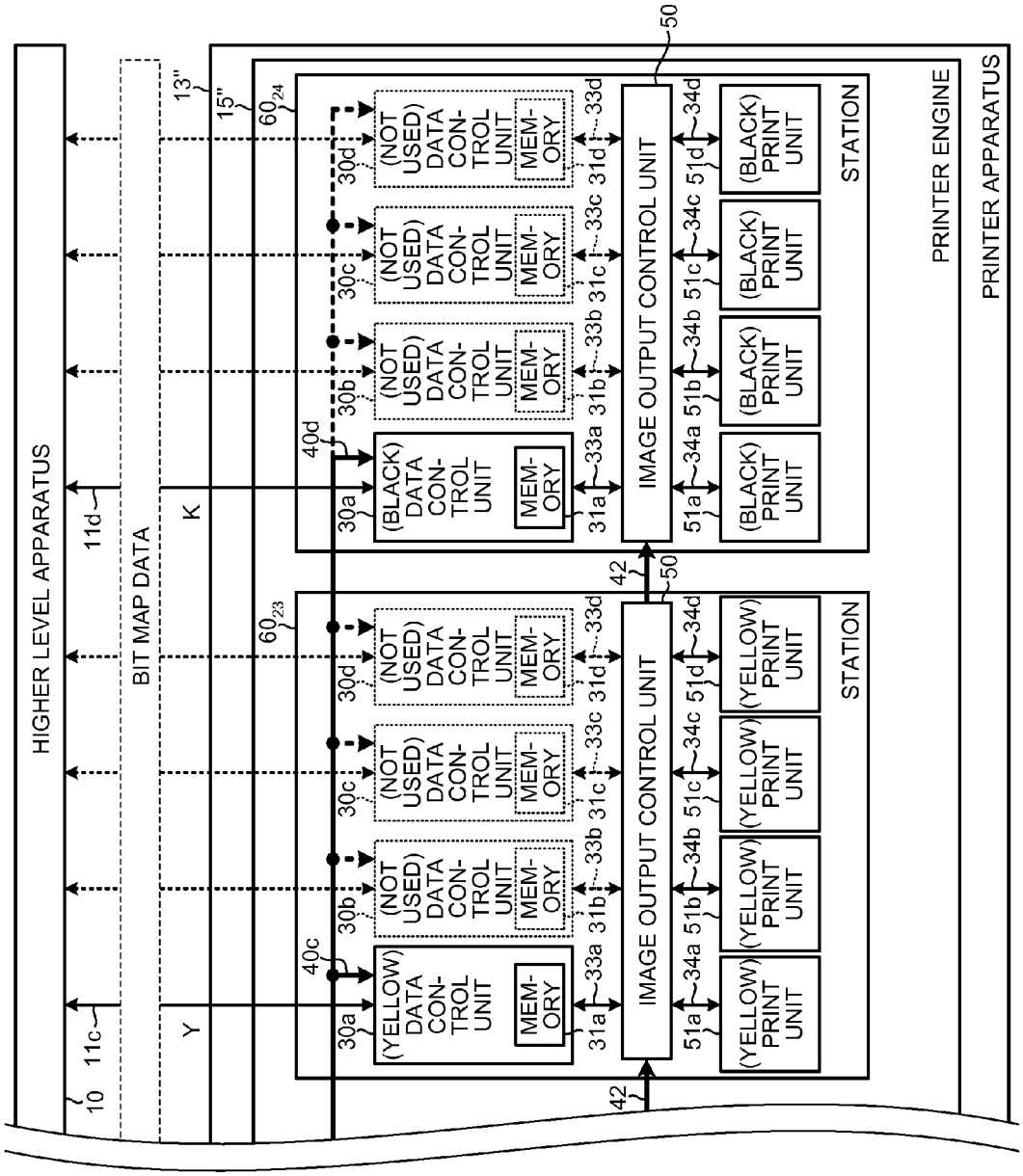
FIG. 23B is a block diagram illustrating a configuration of the example of the printer apparatus having the printer engine of the maximum configuration model.

Subsequently, a maximum configuration model which is the third configuration of the embodiment will be explained. FIGS. 23A and 23B illustrate a configuration of an example of a printer apparatus 13' having a printer engine 15" of the maximum configuration model. FIGS. 23A and 23B illustrate the configuration of the printer apparatus 13" in such a manner that it is divided into two drawings. In FIGS. 23A and 23B, the same portions as those of FIG. 3 explained above are denoted with the same reference numerals, and detailed description thereabout is omitted.

As illustrated in FIGS. 23A and 23B, the printer engine 15" of the maximum configuration includes four stations $60_{21}$, $60_{22}$, $60_{23}$, and $60_{24}$ having the same configuration. These stations $60_{21}$, $60_{22}$, $60_{23}$, and $60_{24}$ have the same configuration as the station 60 of the printer engine 15 of the minimum configuration explained above. Each of them includes the data control units 30a, 30b, 30c and 30d, the image output control unit 50, and the print units 51a, 51b, 51c and 51d.

The engine I/F control lines 40a, 40b, 40c and 40d from the print control unit 322 are connected to the data control units 30a, 30b, 30c and 30d of each of the stations $60_{21}$, $60_{22}$, $60_{23}$, and $60_{24}$. Likewise, the model switch control line 42 from the print control unit 322 is connected to the image output control unit 50 of each of the stations $60_{21}$, $60_{22}$, $60_{23}$, and $60_{24}$.

In the example of FIGS. 23A and 23B, the stations $60_{21}$, $60_{22}$, $60_{23}$, and $60_{24}$ provided in the printer engine 15' of the middle configuration performs printing as follows: the station $60_{21}$ prints in the color C, the station $60_{22}$ prints in the color M, the station $60_{23}$ prints in the color Y, and the station $60_{24}$ prints in the color K.

More specifically, in the station $60_{21}$, all of the four print units 51a, 51b, 51c and 51d are used to print the color C. In this example, only the data control unit 30a of the data control units 30a, 30b, 30c and 30d provided in the station $60_{21}$ is used to process the print image data of the color C.

In the station $60_{22}$, all of the four print units 51a, 51b, 51c and 51d are used to print the color M, and only the data control unit 30a of the data control units 30a, 30b, 30c and 30d is used to process the print image data of the color M. Likewise, in the stations $60_{23}$ and $60_{24}$, all of the four print units 51a, 51b, 51c and 51d are used to print the color Y and the color K, and only the data control unit 30a of the data control units 30a, 30b, 30c and 30d is used to process the print image data of the color M and the color Y.

More specifically, the data control unit 30a of each of the stations $60_{21}$, $60_{22}$, $60_{23}$, and $60_{24}$ is connected to the data lines 11a, 11b, 11c and 11d with which the print image data of the colors, i.e., C, M, Y, K are transferred from the higher level apparatus 10. In each of the stations $60_{21}$, $60_{22}$, $60_{23}$, and $60_{24}$, the data control units 30b, 30c and 30d are not used.

In the example of FIGS. 23A and 23B, only the data control unit 30a is used in each of the stations $60_{21}$, $60_{22}$, $60_{23}$, and $60_{24}$, and the data control units 30b, 30c and 30d are not used in each of the stations $60_{21}$, $60_{22}$, $60_{23}$, and $60_{24}$, but this is not limited to this example. More specifically, the combination where any one of the data control units 30a to 30d is used and the others are not used in each of the stations $60_{21}$, $60_{22}$, $60_{23}$, and $60_{24}$ is not limited to the example of FIGS. 23A and 23B.

FIG. 24 illustrates an example of a data control setting information table in the maximum configuration model. The items of the data control setting information table is the same as those in the data control setting information table of the minimum configuration model as explained with reference to FIG. 11.

In the common items, the number of stations is "4", and the station position number is any one of "1", "2", "3" and "4". The number of data control units per station is "1". Therefore, as illustrated in FIGS. 23A and 23B, only the data control unit 30a is used in each of the stations $60_{21}$, $60_{22}$, $60_{23}$, and $60_{24}$.

On the other hand, in the data control unit-dependent items, a number of a data control unit and a color handled by the data control unit corresponding to the number are associated with each other. Like the minimum configuration explained above, the numbers of the data control units are allocated in order such that a smaller number is allocated to a data control unit arranged at a position closer to the printer controller 14. For example, numbers "1", "2", "3" and "4" are allocated to the four data control unit in such a manner that the number "1" is allocated to the data control unit closest to the printer controller 14, and the number "2" is allocated to the data control unit adjacent thereto, and so on. The data control units "1", "2", "3" and "4" are defined as handling the print image data of the color C, color M, color Y and color K, respectively.

In the example of FIG. 24, the number of data control units per station is "1" from the value of the item of the number of stations in the common item, and accordingly, for example, the stations of the position numbers "1", "2", "3" and "4" of the data control units as indicated by the numbers "1" to "4" are indicated as having the data control units of the numbers "1", "2", "3" and "4" handling the colors C, M, Y and K, respectively.

FIG. 25 illustrates examples of an image output control setting information table according to the maximum configuration model. The items of the image output control setting information table are the same as those in the image output control setting information table in the minimum configuration model as explained with reference to FIG. 12.

Illustrated in (a) of FIG. 25 is an example of an image output control setting information table corresponding to the station of which station position number is "1". In the common items, the number of use of the input I/F controller is "1", and the station position is "1". On the other hand, in the image output control unit-dependent items, the color C is allocated to all the four print units #1, #2, #3 and #4.

Illustrated in (b) of FIG. 25 is an example of an image output control setting information table corresponding to the station of which station position number is "2". In the common items, the number of use of the input I/F controller is "1", and the station position is "2". On the other hand, in the image output control unit-dependent items, the color M is allocated to all the four print units #1, #2, #3 and #4.

Illustrated in (c) of FIG. 25 is an example of an image output control setting information table corresponding to the station of which station position number is "3". In the common items, the number of use of the input I/F controller is "1", and the station position is "3". On the other hand, in the image output control unit-dependent items, the color Y is allocated to all the four print units #1, #2, #3 and #4.

Illustrated in (d) of FIG. 25 is an example of an image output control setting information table corresponding to the station of which station position number is "4". In the common items, the number of use of the input I/F controller is "1", and the station position is "4". On the other hand, in the image output control unit-dependent items, the color K is allocated to all the four print units #1, #2, #3 and #4.

The image output setting information table and the data control setting information table generated by the CPU 321 are provided to the print control unit 322. For example, when the printer apparatus 13" is activated, the print control unit 322 transmits the image output setting information table via the model switch control line 42 to the image output control unit 50 of each of the stations $60_{21}$, $60_{22}$, $60_{23}$, and $60_{24}$ via the model switch control line 42.

In each of the stations $60_{21}$, $60_{22}$, $60_{23}$, and $60_{24}$, the received image output control setting information table is provided to the model switch controller 312. In the model switch controller 312, the model information is set in the model switch unit 334 on the basis of the image output control setting information table. On the basis of the model information, the model switch controller 312 selects a path of print image data of each color.

In addition, the print control unit 322 transmits the data control setting information table via the engine I/F control lines 40a to 40d to the data control units 30a to 30d, respectively, of each of the stations $60_{21}$, $60_{22}$, $60_{23}$, and $60_{24}$. The data control units 30a, 30b, 30c and 30d of each of the stations $60_{21}$, $60_{22}$, $60_{23}$, and $60_{24}$ determines whether to be used or not on the basis of the data control setting information table received, and when the data control units 30a, 30b, 30c and 30d are determined to be used, the data control units 30a, 30b, 30c and 30d determines which color of print image data is to be used.

The configuration of the data control units 30a, 30b, 30c and 30d of each of the stations $60_{21}$, $60_{22}$, $60_{23}$, and $60_{24}$, e.g., whether the data control units 30a, 30b, 30c and 30d are to be used or not and the color of the print image data to be used are determined in advance in accordance with the position number of the station and the number of data control units per station stored in the data control setting information table. However this is not limited to this example. The configuration of each of the data control units 30a to 30d may be defined in accordance with the data control setting information table.

Figure 26:
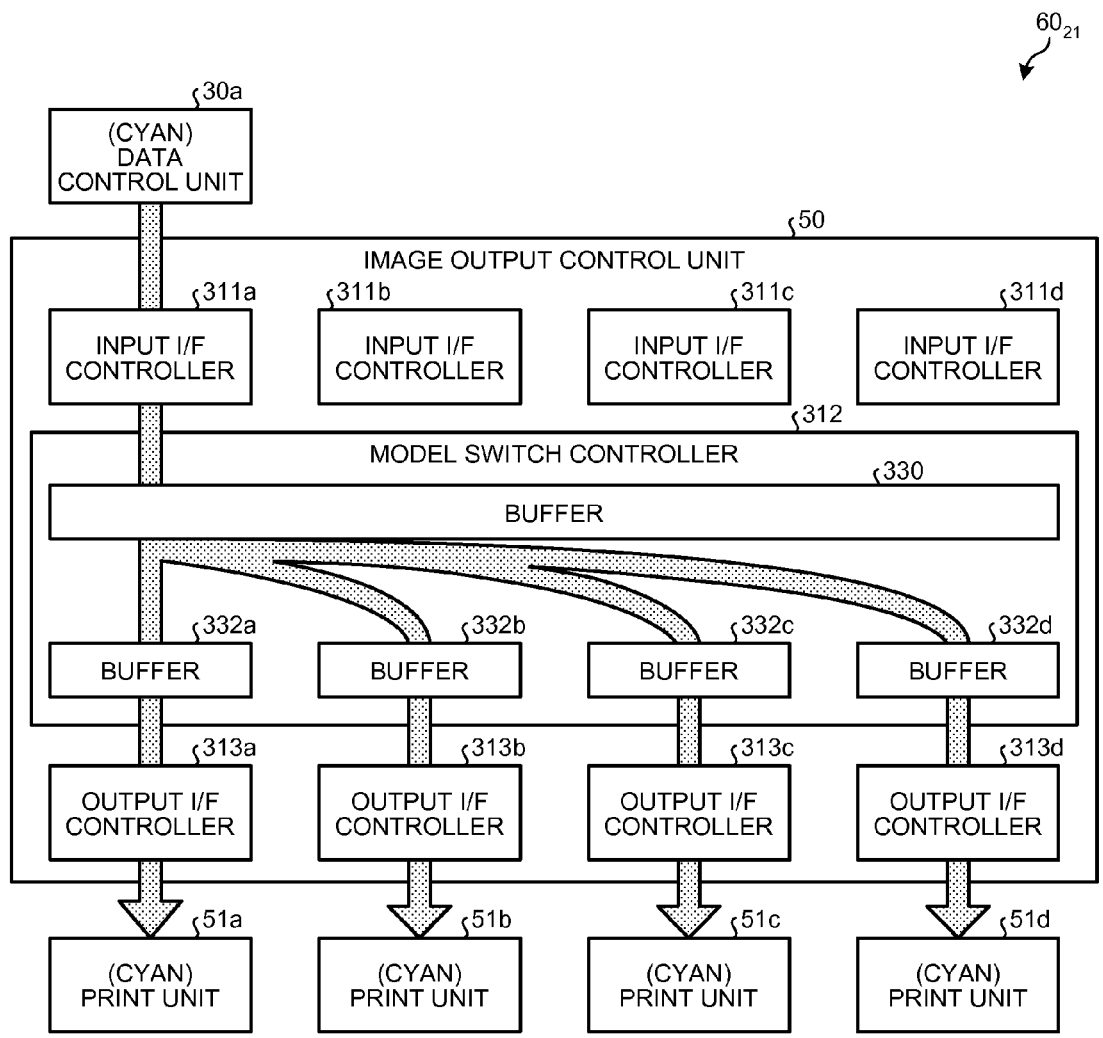
FIG. 26 is a schematic diagram schematically illustrating a flow of print image data from each data control unit to a print unit according to the maximum configuration model.

FIG. 26 schematically illustrates a flow of print image data from the data control units 30a to 30d to the print units 51a to 51d in the station $60_{21}$ in the maximum configuration model as illustrated in FIGS. 23A and 23B. In FIG. 26, the same portions as those of FIG. 9, FIG. 10, and FIGS. 23A and 23B are denoted with the same reference numerals, and detailed description thereabout is omitted.

In the maximum configuration model, the printer engine 15' includes the four stations $60_{21}$, $60_{22}$, $60_{23}$, and $60_{24}$ as described above, and the station $60_{21}$ prints the print sheet 201 using the print units 51a, 51b, 51c and 51d provided in the station $60_{21}$, on the basis of the print image data of the color C transferred from the higher level apparatus 10.

Likewise, the stations $60_{22}$, $60_{23}$, and $60_{24}$ print the print sheet 201 in each color using the print units 51a, 51b, 51c and 51d provided in each of the stations $60_{22}$, $60_{23}$, and $60_{24}$, on the basis of the print image data of the colors M, Y, and K transferred from the higher level apparatus 10.

The stations $60_{21}$, $60_{22}$, $60_{23}$, and $60_{24}$ perform the same processing except that they use different colors, and therefore, the station $60_{21}$ will be explained as an example.

The print image data of the color C are transferred from the higher level apparatus 10 to the data control unit 30a, and are input from the data control unit 30a into the input I/F controller 311a. The print image data of the color C which are input into the input I/F controller 311a are stored to the buffer 330 in the model switch controller 312.

In this case, the model switch controller 312 can recognize that the printing of the print image data of the color C are performed with the four print units 51a, 51b, 51c and 51d, on the basis of the model information set in the model switch unit 334. Therefore, the model switch unit 334 controls the data distribution control unit 331 to store the print image data of the color C read from the buffer 330 into the buffers 332a, 332b, 332c and 332d.

At this occasion, the data distribution control unit 331 preferably sorts the print image data of the color C in an order suitable for high speed printing and store the data to the buffers 332a, 332b, buffers 332c and 332d. For example, as explained with reference to FIG. 22, the print image data of the color C stored in the buffer 330 are read on a raster basis, and are successively stored to the buffers 332a, 332b, 332c and 332d. The buffers 332a, 332b, 332c and 332d store the print image data on a raster basis in such a manner that every four rasters of the original print image data are stored therein.

The model switch controller 312 measures print timing on the basis of the counted value of the counter 335 started upon the print head instruction transmitted in synchronization with the sheet conveyance from the print control unit 322, and when the print timing is attained, the print image data of the color C is read on a raster basis from the buffers 332a, 332b, 332c and 332d. The print image data of the color C thus read on a raster basis are provided via the output I/F controllers 313a, 313b, 313c and 313d to the print units 51a, 51b, 51c and 51d.

As described above, according to the maximum configuration, the colors, i.e., C, M, Y, K are respectively printed using the four print units, and therefore, this can achieve still higher speed printing process than the middle configuration explained above.

Print Sequence According to Third Configuration

Figure 27A:
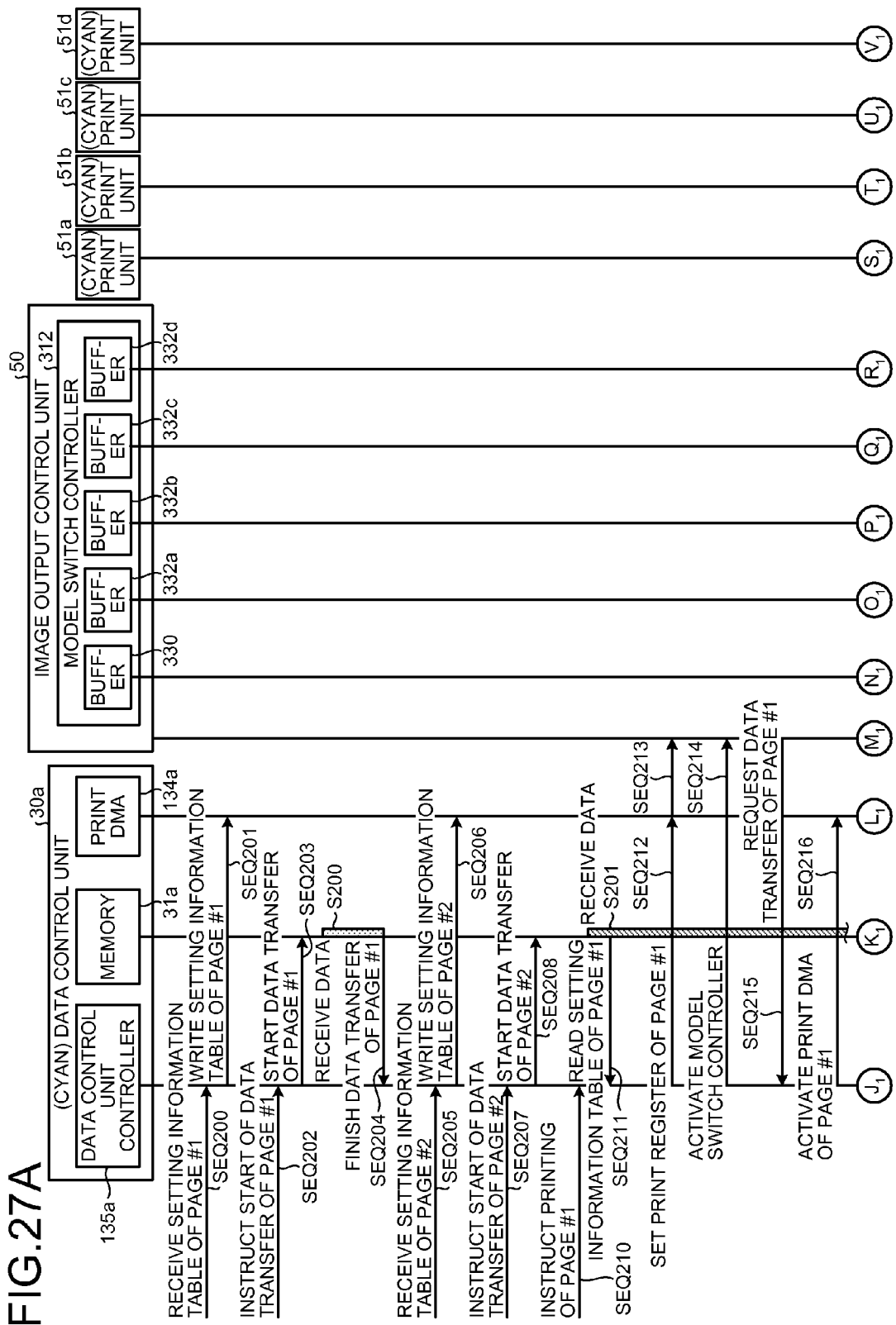
FIG. 27A is a sequence diagram illustrating a print sequence of an example of the maximum configuration.
Figure 27C:
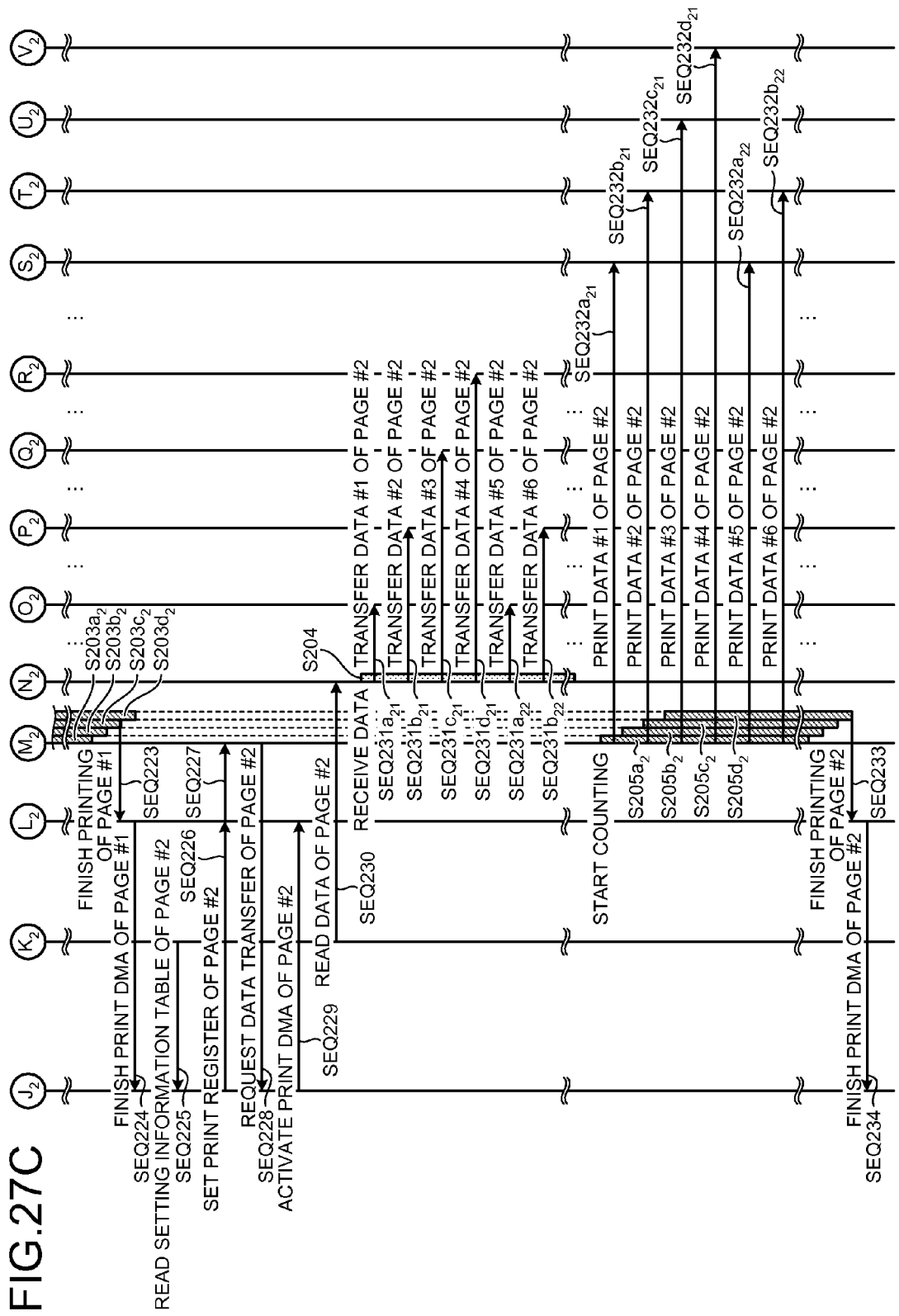
FIG. 27C is a sequence diagram illustrating a print sequence of an example of the maximum configuration.

Subsequently, print sequence in the maximum configuration which is the third configuration of the embodiment will be explained in detail. FIGS. 27A, 27B and 27C illustrate a print sequence of an example according to the maximum configuration, while attention is given to the printing of the print image data of the color C. More specifically, an image output control unit 50 and print units 51a, 51b, 51c and 51d as illustrated in FIGS. 27A to 27C are configured to be included in the station $60_{21}$. It should be noted that the print sequence of the colors M, Y, K is substantially the same as the print sequence of the color C, and description thereabout is omitted. The print sequence of the colors M, Y, K is executed in parallel with the print sequence of the color C.

It should be noted that FIGS. 27A and 27C are obtained by dividing a series of sequence diagram, and flows of corresponding processing in FIGS. 27A and 27B and FIGS. 27B and 27C are denoted with the same symbols ($J_1$ to $V_1$ and $J_2$ to $V_2$). In FIGS. 27A to 27C, the same portions as those of FIGS. 9 and 10 are denoted with the same reference numerals, and detailed description thereabout is omitted. Likewise, in FIGS. 27A to 27C, the same portions as those in the sequence diagram of FIG. 16 are denoted with the same reference numerals, and detailed description thereabout is omitted. Likewise, in FIGS. 27A to 27C, the same portions as those in the sequence diagram of FIG. 16 are denoted with subscripts and the like.

In the sequence of FIGS. 27A to 27C, processing from SEQ200 at which the setting information table of page #1 is received by the data control unit 30a to SEQ217 at which the image output control unit 50 starts reading the print image data of page #1 stored in the memory 31a is the same as the processing as illustrated in FIG. 16, and explanation thereabout is omitted.

In SEQ217, the print DMA 134a reads the print image data of the color C of page #1 from the memory 31a, and transfers the data to the model switch controller 312, and stores the data to the specified address of the buffer 330. The print image data of the color C stored in the buffer 330 are read from the buffer 330 in accordance with the control of the data distribution control unit 331, and a predetermined amount of data are repeated transferred to the buffers 332a, 332b, 332c and 332d corresponding to the print units 51a, 51b, 51c and 51d, respectively (SEQ218$a_{21}$, SEQ218$a_{22}$, . . . , sEQ218$b_{21}$, SEQ218$b_{22}$, . . . , SEQ218$c_{21}$, . . . , and, SEQ218$d_{21}$, . . . ).

At this occasion, the model switch controller 312 sorts, an in appropriate order, the print image data read from the buffer 330 and transfers the print image data to the buffers 332a, 332b, 332c and 332d, in order to print the print image data of the color C using the print units 51a, 51b, 51c and 51d.

When the data control unit 30a finishes the transfer of the print image data of the color C of page #1 to the buffers 332a, 332b, 332c and 332d for the print units 51a, 51b, 51c and 51d, the data control unit 30a informs the print control unit 322 to that effect (see FIG. 8, SEQ111a).

Likewise, although not illustrated, in each of stations $60_{22}$, $60_{23}$, and $60_{24}$, when the transfer of the print image data of the color Y, M, and K of page #1 to the buffers 332a, 332b, 332c and 332d for the print units 51a, 51b, 51c and 51d is finished, the data control unit 30a informs the print control unit 322 to that effect.

When the print control unit 322 receives the report indicating the finish of the transfer from the stations $60_{21}$, $60_{22}$, $60_{23}$, and $60_{24}$, the print control unit 322 transmits the print head instruction to the stations $60_{21}$, $60_{22}$, $60_{23}$, and $60_{24}$ (SEQ220).

In this example of FIGS. 27A to 27C, after the data control unit controller 135a in the station $60_{21}$ receives the report of the finish of the data transfer of page #2, the data control unit controller 135a receives the print instruction of page #2 from the print control unit 322 (SEQ219). When the data control unit controller 135a receives the print head instruction from the print control unit 322 in SEQ220, the data control unit controller 135a notifies, in accordance with the received print head instruction, the print head instruction to the print DMA 134a and the model switch controller 312 (SEQ221a, SEQ221b).

When the model switch controller 312 in the station $60_{21}$ receives the print head instruction, the counter 335 starts counting in accordance with the raster counter. In the example of the maximum configuration, the print image data of the color C are stored in the buffer memories 332a, 332b, 332c and 332d, in such a manner that every four raster data are stored to each of them. Accordingly, the counter 335 counts for each of the buffer memories 332a, 332b, 332c and 332d (step S203$a_2$, step S203$b_2$, step S203$c_2$, and step S203$d_2$).

In the example of FIGS. 27A and 27C, the timing with which the counter 335 starts counting in the buffer memories 332a and 332b is different as in, e.g., step S203$a_2$ to step S203$d_2$. This is because the print positions of the print units 51a, 51b, 51c and 51d corresponding to the buffer memories 332a, 332b, 332c and 332d, respectively, are different in the conveyance direction of the print sheet 201.

In the model switch controller 312, the timing with which the print image data are transferred to the print units 51a, 51b, 51c and 51d is determined in advance in accordance with the model information recognized on the basis of the image output control setting information table. For example, when the counted value corresponding to the buffer memory 332a counted by the counter 335 becomes the same as the transfer timing at which the data are transferred to the print unit 51a, the model switch controller 312 reads the print image data 401a from the buffer 332a, and transfers the data to the print unit 51a (SEQ222$a_{21}$, SEQ222$a_{22}$, . . . ). With the transfer of the print image data, the print unit 51a starts printing.

Likewise, when the counted value corresponding to the buffer memory 332b counted by the counter 335 becomes the same as the transfer timing at which the data are transferred to the print unit 51b, the model switch controller 312 reads the print image data from the buffer 332b, and transfers the data to the print unit 51b (SEQ222$b_{21}$, SEQ222$b_{22}$, ... ). With the transfer of the print image data, the print unit 51b starts printing. The buffer memories 332c and 332d are also the same with regard to this timing of reading of the print image data, and description thereabout is omitted.

For example, the reading of the print image data of the color C from the buffer 332a and the transfer of the read data to the print unit 51a are performed with, for example, a predetermined amount of print image data, and are repeated until all the print image data of the color C of page #1 stored in the buffer 332a have been transferred.

When all the transfer of the print image data of the color C of page #1 to the print units 51a, 51b, 51c and 51d is finished in the station $60_{21}$, the model switch controller 312 informs the print DMA 134a of the finish of the printing of page #1 (SEQ223). The print DMA 134a having received the print end report informs the data control unit controller 135a that the DMA transfer of the print image data of the color C of page #1 has been finished (SEQ224). The DMA transfer finish report of the print image data of the color C of page #1 is transmitted from the data control unit controller 135a to the print control unit 322.

The stations $60_{22}$, $60_{23}$, and $60_{24}$ perform the same processing as SEQ220 to SEQ224 explained above on the print image data of the colors M, Y, and K. Explanation about the processing on the print image data of the colors M, Y, and K is omitted in order to avoid complexity.

In this example, the data control unit controller 135a already received the print instruction of page #2 in SEQ219 explained above. Accordingly, when the data control unit controller 135a receives, from the print DMA 134a, the report indicating that the DMA transfer of the print image data of page #1 has been finished, the data control unit controller 135a executes print processing of page #2 in accordance with the print instruction of page #2 already received, like the print instruction reception of page #1.

More specifically, in the station $60_{21}$, the data control unit controller 135a reads the setting information table of page #2 from the memory 31a (SEQ225), and sets, in the print DMA 134a and the model switch controller 312, a print register for page #2, on the basis of the setting information table of page #2 read in SEQ225 (SEQ226, SEQ227). When the print register of page #2 is set, the model switch controller 312 requests the data control unit controller 135a to transfer the print image data of the color C of page #2 (SEQ228).

The data control unit controller 135a instructs the print DMA 134a to activate in accordance with the data transfer request of SEQ228, and instructs the DMA transfer of the print image data of the color C of page #2 stored in the memory 31a (SEQ229). The print DMA 134a reads the print image data of the color C of page # from the memory 31a in accordance with the instruction, and transfers the data to the model switch controller 312 (SEQ230), and stores the data to the specified address of the buffer 330.

The predetermined amount of print image data of the color C of page #2 stored in the buffer 330 are read from the buffer 330 in accordance with the control of the data distribution control unit 331, and are repeated transferred to the buffers 332a, 332b, 332c and 332d corresponding to the print units 51a, 51b, 51c and 51d, respectively (SEQ231$a_{21}$, SEQ231$a_{22}$, SEQ231$b_{21}$, SEQ231$b_{22}$, ... , SEQ231$c_{21}$, ... , and, SEQ231$d_{21}$, ... ). At this occasion, the model switch controller 312 sorts, an in appropriate order, the print image data read from the buffer 330 and transfers the print image data to the buffers 332a, 332b, 332c and 332d, in order to print the print image data of the color C using the print units 51a, 51b, 51c and 51d, as explained with reference to FIG. 22.

When the data control unit 30a finishes the transfer of the print image data of the color C of page #2 to the buffers 332a, 332b, 332c and 332d for the print units 51a, 51b, 51c and 51d, the data control unit 30a informs the print control unit 322 to that effect (see FIG. 8, SEQ115).

Likewise, although not illustrated, in each of stations $60_{22}$, $60_{23}$, and $60_{24}$, when the transfer of the print image data of the color Y, M, and K of page #2 to the buffers 332a, 332b, 332c and 332d for the print units 51a, 51b, 51c and 51d is finished, the data control unit 30a informs the print control unit 322 to that effect.

In the station $60_{21}$, the raster counter is counted for a page length of page #2 by the counter 335, and thereafter, the model switch controller 312 resets the counted value to "0", and resumes counting in the buffer memories 332a, 332b, 332c and 332d (step S205$a_2$, step S205$b_2$, step S205$c_2$ and step S205$d_2$).

For example, when the counted value corresponding to the buffer memory 332a counted by the counter 335 becomes the same as the transfer timing at which the data are transferred to the print unit 51a, the model switch controller 312 reads the print image data 401a from the buffer 332a, and transfers the data to the print unit 51a (SEQ232$a_{21}$, SEQ232$a_{22}$, ... ). With the transfer of the print image data 401a, the print unit 51a executes printing.

Likewise, every time the counted value corresponding to the buffer memory 332b counted by the counter 335 becomes the same as the transfer timing at which the data are transferred to the print unit 51b, the model switch controller 312 reads the print image data 401b from the buffer 332b, and transfers the data to the print unit 51b (SEQ232$b_{21}$, SEQ232$b_{22}$, ... ). With the transfer of the print image data 401a, the print unit 51b starts printing. The buffer memories 332c and 332d are also the same with regard to this timing of reading of the print image data, and description thereabout is omitted.

When all the transfer of the print image data of the color C of page #2 to the print units 51a, 51b, 51c and 51d is finished in the station $60_{21}$, the model switch controller 312 informs the print DMA 134a of the finish of the printing of page #2 (SEQ233). The print DMA 134a having received the print end report of page #2 informs the data control unit controller 135a that the DMA transfer of the print image data of page #2 has been finished (SEQ234). The DMA transfer finish report of the print image data of page #2 is transmitted from the data control unit controller 135a to the print control unit 322 (see SEQ122a and SEQ122b of FIG. 8).

Like the above color C in the station $60_{21}$, the stations $60_{22}$, $60_{23}$, and $60_{24}$ performs the print processing of the colors M, Y, and K. Explanation about the processing on the print image data of the colors M, Y, and K is omitted here in order to avoid complexity.

When, in each of the stations $60_{22}$, $60_{23}$, and $60_{24}$, the DMA transfer of the print image data of page #2 in each color is finished, the print DMA 134a in each of $60_{22}$, $60_{23}$, and $60_{24}$ informs the data control unit controller 135a that the DMA transfer is finished, and the data control unit controller 135a transmits the DMA transfer finish report of the print image data to the print control unit 322 (see SEQ122b to SEQ122d of FIG. 8).

As described above, according to the present embodiment, the station 60 having the print units 51a to 51d executing printing is provided with the image output control unit 50 for setting the path of the print image data in accordance with the setting information data provided from the print control unit 322. Therefore, the same station can be applied to different model configurations of the printer engine 15, and this makes it easy to design the system and can reduce the cost.

In the above explanation, the model configurations of the printer engines 15 are three types, i.e., the minimum configuration model, the middle configuration model, and the maximum configuration model having one station 60, two stations 60, and four stations 60, respectively, but this is not limited to this example. For example, the printer engine 15 may have three stations 60 or five or more stations 60. The number of print units for printing the colors, i.e., C, M, Y, K may not be the same in each color. Further, the number of colors of printing may not be limited to four colors, and multiple colors may be printed. In any case, by appropriately setting the data control unit setting information table and the image output control setting information table, the path of the print image data in the image output control unit 50 of each station 60 can be appropriately selected.

According to the embodiments, there is an advantage in that a print system for transferring print image data to a printing apparatus from a higher level apparatus is allowed to easily support many variations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus comprising:
   one or more print execution units each including
      a plurality of storage units configured to receive and store pieces of image data transferred from a higher level apparatus via a first transfer path, respectively;
      a plurality of image forming units configured to form an image on a print medium in accordance with the pieces of image data stored in the storage units; and
      a selection unit configured to select a path for transferring a piece of image data stored in the storage units for each of the image forming units; and
   a print control unit configured to control the print execution units to print the image data in accordance with control information transferred from the higher level apparatus via a second transfer path, wherein
      the selection unit selects the path in accordance with configuration information indicating configuration of all of the one or more print execution units,
      a plurality of pieces of image data corresponding respectively to different colors are transferred from the higher level apparatus via the first transfer path, and
      if a total number of image forming units in the print execution units is more than the number of colors of the image data, the selection unit selects the path to transfer the pieces of image data corresponding to a same color to at least two image forming units in the one or more print execution units.

2. The printing apparatus according to claim 1, wherein the configuration information is transferred from the print control unit to each of the print execution units.

3. The printing apparatus according to claim 1, wherein
   the selection unit includes a first buffer configured to store the pieces of image data read from the storage units and a plurality of second buffers configured to store pieces of image data to be provided to the image forming units, the second buffers corresponding to the image forming units, respectively, and
   if a total number of image forming units in the one or more print execution units is more than the number of colors of the image data, the pieces of image data are read from the first buffer on a raster basis, and the piece of image data thus read on a raster basis is successively stored to the corresponding second buffer unit.

4. The printing apparatus according to claim 2, wherein
   the selection unit includes a first buffer configured to store the pieces of image data read from the storage units and a plurality of second buffers configured to store pieces of image data to be provided to the image forming units, the second buffers corresponding to the image forming units, respectively, and
   if a total number of image forming units in the one or more print execution units is more than the number of colors of the image data, the pieces of image data are read from the first buffer on a raster basis, and the piece of image data thus read on a raster basis is successively stored to the corresponding second buffer unit.

5. The printing apparatus according to claim 2, further comprising a reception unit configured to receive the configuration information,
   wherein the print control unit transfers the configuration information received by the reception unit to each of the print execution units.

6. A method of controlling a printing apparatus, comprising:
   storing pieces of image data transferred from a higher level apparatus via a first transfer path, in a plurality of storage units;
   forming, by a plurality of image forming units, an image on a print medium in accordance with the pieces of image data stored in the storage units;
   selecting, by a selection unit, a path for transferring a piece of image data stored in the storage units for each of the image forming units, wherein the selecting includes selecting the path in accordance with configuration information indicating configuration of all of one or more print execution units each including the storage units, the image forming units, and the selection unit; and
   transferring a plurality of pieces of image data corresponding respectively to different colors from the higher level apparatus via the first transfer path, and if a total number of image forming units in the print execution units is more than the number of colors of the image data, selecting the path to transfer the pieces of image data corresponding to a same color to at least two image forming units in the one or more print execution units.

* * * * *